US010157111B2

(12) United States Patent
Kobashi

(10) Patent No.: US 10,157,111 B2
(45) Date of Patent: Dec. 18, 2018

(54) CONTROLLING DEVICE, MANAGING DEVICE, STORAGE SYSTEM, CONTROL METHOD, MANAGEMENT METHOD, AND NON-TRANSITORY COMPUTER-READABLE STORAGE MEDIUM FOR MIRRORING DATA

(71) Applicant: FUJITSU LIMITED, Kawasaki-shi, Kanagawa (JP)

(72) Inventor: Kazunori Kobashi, Yamato (JP)

(73) Assignee: FUJITSU LIMITED, Kawasaki (JP)

(*) Notice: Subject to any disclaimer, the term of this patent is extended or adjusted under 35 U.S.C. 154(b) by 146 days.

(21) Appl. No.: 15/286,632

(22) Filed: Oct. 6, 2016

(65) Prior Publication Data
US 2017/0168909 A1 Jun. 15, 2017

(30) Foreign Application Priority Data
Dec. 15, 2015 (JP) .................................. 2015-244630

(51) Int. Cl.
*G06F 11/20* (2006.01)
(52) U.S. Cl.
CPC ................. *G06F 11/2069* (2013.01)
(58) Field of Classification Search
CPC ................................................ G06F 11/2069
See application file for complete search history.

(56) References Cited

U.S. PATENT DOCUMENTS

| 7,058,731 | B2* | 6/2006 | Kodama | ............. | G06F 11/2058 |
| | | | | | 710/1 |
| 7,089,448 | B2* | 8/2006 | Hinshaw | ............. | G06F 11/2069 |
| | | | | | 711/114 |
| 7,185,222 | B2* | 2/2007 | Burton | ................ | G06F 11/0727 |
| | | | | | 714/5.11 |
| 7,519,851 | B2* | 4/2009 | Kitamura | ............ | G06F 11/2069 |
| | | | | | 714/6.23 |
| 2010/0088485 | A1 | 4/2010 | Ikeda et al. | | |
| 2014/0325263 | A1 | 10/2014 | Hiraoka et al. | | |
| 2015/0278049 | A1* | 10/2015 | Saito | ..................... | G06F 3/0617 |
| | | | | | 714/6.3 |

FOREIGN PATENT DOCUMENTS

| JP | 2010-92259 | 4/2010 |
| JP | 2014-215990 | 11/2014 |

* cited by examiner

*Primary Examiner* — Joseph R Kudirka
(74) *Attorney, Agent, or Firm* — Fujitsu Patent Center

(57) ABSTRACT

A controlling device: receives state information indicating the state of a first storage region and the state of a second storage region for mirroring the first storage region; detects an error of an input and output process executed on the first storage region; executes, in response to the error, a first process if the first storage region is in a read-write mode, the first process including determining the states of the first and second storage regions, and selecting, based on the determined states, either one of executing the input and output process on the second storage region or stopping the input and output process executed on the first and second storage regions; and executes, in response to the error, a second process if the first storage region is in a read-only mode, the second process including executing the input and output process on the second storage region.

14 Claims, 17 Drawing Sheets

CONTROLLING DEVICE, MANAGING DEVICE, STORAGE SYSTEM, CONTROL METHOD, MANAGEMENT METHOD, AND NON-TRANSITORY COMPUTER-READABLE STORAGE MEDIUM FOR MIRRORING DATA

CROSS-REFERENCE TO RELATED APPLICATION

This application is based upon and claims the benefit of priority of the prior Japanese Patent Application No. 2015-244630, filed on Dec. 15, 2015, the entire contents of which are incorporated herein by reference.

FIELD

The embodiment discussed herein is related to a controlling device, a managing device, a storage system, a control method, a management method, and a non-transitory computer-readable storage medium.

BACKGROUND

Traditionally, as a storage system that achieves a storage device with a flexible volume configuration and memory capacity without being restricted by a volume configuration and memory capacity of a physical storage device, storage for a virtual environment or a so-called virtual storage device exists. The virtual storage device has therein actual storage that controls access to the physical storage device. The virtual storage device generates a virtual volume by a processor device that manages the actual storage.

The virtual volume is formed on the processor device within the virtual storage device and associated with a physical storage region on the actual storage. In addition, a processor device that is among a plurality of processor devices and serves as an agent is configured to control a driver and monitor events such as errors and notify a processor device serving as a manager of the events. The processor device that serves as the manager is one of the processor devices within the virtual storage device and manages configuration information on the virtual volume and the state of the virtual volume and plays a role in controlling the agent.

In the virtual storage device, a segment that forms the virtual volume is mirrored for a case where a failure occurs in the actual storage storing data, for example. The segment is a region having a certain size and storing data extracted from a logical unit number (LUN) of the actual storage. Upon the occurrence of a failure, the virtual storage device continuously executes access in order from a segment belonging to a failed LUN via a segment that stores data obtained by mirroring and is assigned to belong to another LUN, and the virtual storage device improves the availability of the storage.

As a related conventional technique, there is a technique for executing a process of restarting an I/O process if storage is blocked upon the detection of an error of the I/O process executed on the storage and executing a process of blocking the storage if the storage is not blocked and the frequency at which an error occurs is equal to or higher than a predetermined value. In addition, there is a technique for copying a pool providing a virtual volume per unit of volume that forms the pool and switching a blocked volume to a copied volume in the pool if a physical device is blocked.

As examples of the related art, Japanese Laid-open Patent Publications 2014-215990 and 2010-092259 are known.

SUMMARY

According to an aspect of the invention, a controlling device includes: a memory; and a processor coupled to the memory and configured to a process. The process executed by the processor includes: receiving state information indicating the state of a first storage region and the state of a second storage region for storing data mirrored from the first storage region, from a managing device that manages the states of the first and second storage regions; detecting an error of an input and output process executed on the first storage region; executing, in response to the detection of the error, a first process if an access mode for the first storage region is a mode in which reading and writing are enabled, the first process including notifying the managing device of the error, determining the states of the first and second storage regions based on the error and the state information, and selecting, based on the determined states, either one of executing the input and output process on the second storage region or stop the input and output process executed on the first and second storage regions; executing, in response to the detection of the error, a second process if the access mode for the first storage region is a mode in which the reading is enabled and the writing is disabled, the second process including executing the input and output process on the second storage region and notifying the managing device of the error.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

According to the conventional techniques, a time period from the occurrence of an error of an input and output process executed on actual storage within a storage system to the restart of the input and output process increases in some cases. For example, as the number of agents that use the actual storage in which an error occurred increases, the number of errors, to be notified to a manager, of the input and output process increases and a time period for a process executed by the manager on the errors of the input and output process increases. As a result of the increase in the time period for the process executed by the manager on the errors of the input and output process, the aforementioned time period from the occurrence of the error of the input and output process to the restart of the input and output process may exceed a timeout time for an input and output (I/O) request.

As one aspect of the present embodiment, provided are solutions for being able to suppress a time period from the occurrence of an error of an input and output process to the restart of the input and output process in a storage system.

Hereinafter, an embodiment of a controlling device disclosed herein, a managing device disclosed herein, a storage system disclosed herein, a control program disclosed herein, a management program disclosed herein, a control method disclosed herein, and a management method disclosed herein is described in detail with reference to the accompanying drawings.

Figure 1:
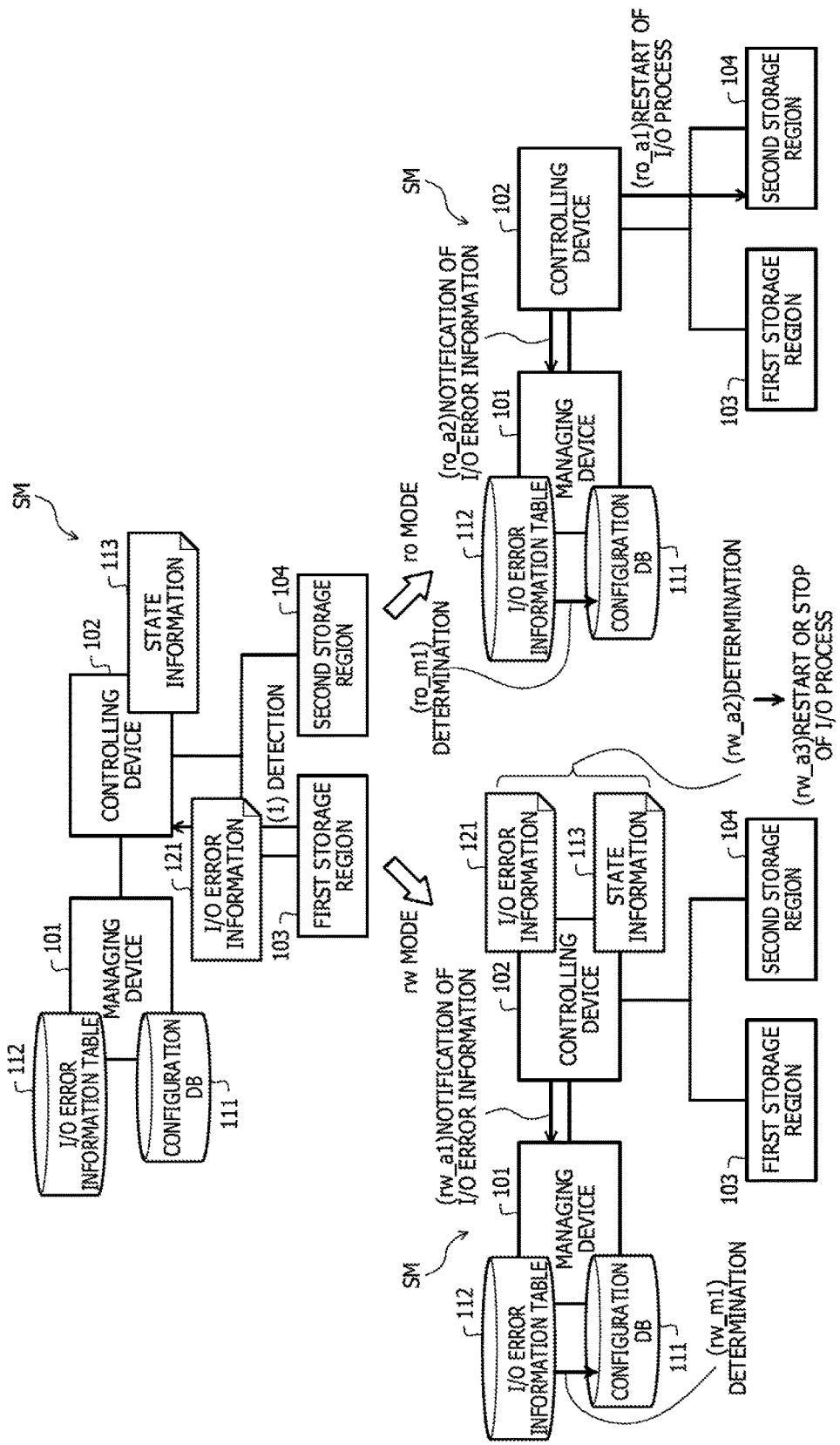
FIG. 1 is a diagram describing an example of operations of a storage system according to an embodiment.

FIG. 1 is a diagram describing an example of operations of a storage system SM according to the embodiment. Referring to FIG. 1, the storage system SM includes a managing device 101, at least one controlling device 102, and storage units (SUs), each of which has a first storage region 103 and a second storage region 104. The storage units, each of which has the first storage region 103 and the second storage region 104, may be the same or different from each other.

The managing device 101 and the controlling device 102 are processor units (PUs) having processors. The managing device 101 is a computer that manages the controlling device 102 and serves as a manager. The controlling device 102 is a computer that controls the first and second storage regions 103 and 104 as storage controlled by the controlling device and serves as an agent. The managing device 101 may control storage to be controlled by the managing device 101 and manage the managing device 101. The managing device 101 and the controlling device 102 are made redundant. Specifically, in preparation for a failure of the managing device 101, the controlling device 102 may have functions of the managing device 101.

Each of the first and second storage regions 103 and 104 is at least one storage region. For example, the first and second storage regions 103 and 104 are segments that are storage regions storing data extracted from LUNs that identify logical storage units. In addition, the first and second storage regions 103 and 104 may not be the segments and may be the LUNs or may be storage regions of the actual storage such as a hard disk, an optical disc, a flash memory, or a magnetic tape. Relationships between segments, LUNs, a virtual volume formed of the segments or a so-called VDISK (virtual disk) are described in detail with reference to FIG. 4. The case where the first and second storage regions 103 and 104 are the segments is described below.

The second storage region 104 is a storage region for storing data mirrored from the first storage region 103. A combination of a segment that is a source of the mirroring and a segment storing data mirrored from the source is referred to as a "segment group". In addition, in a case where a certain segment is included in a segment group, another segment included in the same segment group including the certain segment is referred to as a "segment that forms a pair with the certain segment" in some cases.

Even if I/O errors simultaneously occur in the input and output (I/O) process, the managing device 101 uses a configuration database (DB) 111 to centrally manage the states of the segments so that only one surface as one of the segments becomes abnormal (invalid) in order to avoid blocking of the I/O process to be executed on a lower-level unit. For example, if a segment as a surface opposite to a segment in which an I/O error occurred is normal (or valid), it is determined that the segment in which the I/O error occurred is invalid. Thus, the controlling device 102 transmits, to the managing device 101, information on the position of the segment in which the I/O error occurred.

If a failure of the I/O process executed on the first storage region 103 occurs, the storage system SM continuously executes access via the second storage region 104 and may improve the availability of the storage system SM by executing the mirroring.

With an increase in a requested memory capacity, the storage system SM may expand a whole storage region of the storage system SM or may be scaled out. Although data of the scaling-out are described later with reference to FIG. 2, a controlling device 102 is added to the storage system SM, for example. Thus, by adding actual storage corresponding to the added controlling device 102, the whole performance and memory capacity of the storage system SM may be increased.

A time period from the occurrence of an error of the I/O process executed on the actual storage to the restart of the I/O process increases in some cases. Specifically, in a case where the storage system SM is scaled out, as the number of agents that access the actual storage in which the error occurred increases, the number of notifications provided to the manager and indicating the error of the input and output process increases. As a result, a time period for a process executed by the manager on the error of the input and output process increases. As a result of the increase in the time period for the process executed by the manager on the error of the input and output process, the time period from the occurrence of the error of the I/O process to the restart of the I/O process may exceed a timeout time for an I/O request. Especially, in a virtual storage device, each LUN is used as segments of multiple VDISKs, a failure of one LUN affects a large number of VDISKs, and a large number of I/O errors are likely to occur. In addition, due to the large number of I/O errors, a user operation such as VDISK generation for which certain response performance is requested may be delayed.

In the embodiment, in order to improve the throughput of the I/O process to be executed by the manager, an access mode of a VDISK to which a storage region in which an I/O error occurred belongs is paid attention, and the process is branched based on whether the access mode is a read write mode (rw mode) or a read only mode (ro mode). Specifically, the embodiment describes a method in which, if the first storage region 103 is in the rw mode upon the occurrence of an I/O error of the I/O process executed on the first storage region 103, the controlling device 102 determines the states of the segments and restarts or stops the I/O process, and if the first storage region 103 is in the ro mode upon the occurrence of the I/O error of the I/O process executed on the first storage region 103, the controlling device 102 restarts the I/O process. The rw mode is a mode in which reading and writing are enabled. The ro mode is a mode in which the reading is enabled and the writing is disabled.

An example of operations of the storage system SM according to the embodiment is described with reference to FIG. 1. The controlling device 102 receives, from the managing device 101, state information 113 indicating the states of the first and second storage regions 103 and 104. The state information 113 is information extracted from the configuration DB 111. Specifically, the state information 113 indicates whether the first storage region 103 is valid or invalid and whether the second storage region 104 is valid or invalid.

As indicated by (1) in FIG. 1, it is assumed that the controlling device 102 that received an I/O request from a business server executes the I/O process on the first storage region 103 and detects I/O error information 121 indicating an I/O error of the I/O process executed on the first storage region 103. Operations of the storage system SM after the detection vary depending on whether a VDISK to which the first storage region 103 belongs is in the rw mode or in the ro mode. If the VDISK is in the rw mode and an I/O error occurs due to an extension of a write request, the equivalence of the two segments as two surfaces is not guaranteed. The equivalence of the segments indicates that data stored in one of the two segments as the two surfaces match data stored in the other segment. If the occurrence of the I/O error is not reliably notified to the manager, and an I/O error surface is not separated, the equivalence of the segments is not established upon a VDISK operation executed immediately after the detection of the I/O error information 121 or upon the VDISK generation or the like, and data is finally damaged.

If the VDISK is in the ro mode, the equivalence of the two segments as the two surfaces is established upon the I/O process. Thus, a delay time of the I/O process may be minimized by restarting the I/O process without a notification to the manager.

Requirements for the use of the VDISK based on the aforementioned assumption are as follows. Data stored in the VDISK that is in the rw mode may be referenced and updated from a single node. For example, in a case where the VDISK is used as a normal disk, the rw mode is used. On the other hand, the data stored in the VDISK that is in the ro mode may be referenced from multiple nodes. For example, in a case where the VDISK is used as a master of a snapshot, the ro mode is used. During the time when the VDISK is in the ro mode, the data stored in the VDISK are not updated.

If the VDISK is in the rw mode, the controlling device 102 notifies the managing device 101 of the I/O error information 121, as indicated by (rw_a1) in FIG. 1. The I/O error information 121 notified to the managing device 101 is stored in an I/O error information table 112 that is a storage region included in the managing device 101 and configured to temporarily store the I/O error information 121.

Then, the controlling device 102 determines the states of the first and second storage regions 103 and 104 based on the I/O error information 121 and the state information 113, as indicated by (rw_a2) in FIG. 1. Specifically, if the state information 113 indicates that the second storage region 104 that forms a pair with the first storage region 103 in which the error indicated in the I/O error information 121 occurred is valid, the controlling device 102 determines that the first storage region 103 is invalid. On the other hand, if the second storage region 104 is invalid, the controlling device 102 determines that the states of the first and second storage regions 103 and 104 are the same as the states indicated in the state information 113.

Then, the controlling device 102 restarts or stops the I/O process based on the determined states. For example, if the controlling device 102 determines that the first storage region 103 is invalid, the controlling device 102 switches the region to be subjected to the I/O process to the second storage region 104 and restarts the I/O process. If the controlling device 102 determines that the states of the first and second storage regions 103 and 104 are the same as the states indicated in the state information 113, or the second storage region 104 is invalid, the controlling device 102 stops the I/O process. Then, the controlling device 102 returns the I/O error to a higher-level device such as the source of the I/O request.

The managing device 101 determines the states of the first and second storage regions 103 and 104 based on the I/O error information table 112 and the configuration DB 111 at certain time intervals, as indicated by (rw_m1) in FIG. 1. In the I/O error information table 112, the I/O error information 121 received from the controlling device 102 during a predetermined time period is accumulated. The predetermined time period is a value set in advance by an administrator of the storage system SM based on the processing performance of the managing device 101, the number of controlling devices 102, and the like. For example, the predetermined time period is 10 seconds.

If the VDISK is in the ro mode, the controlling device 102 switches the region to be subjected to the I/O process to the second storage region 104 in order to immediately restart the I/O process and restarts the I/O process, as indicated by (ro_a) in FIG. 1. Then, the controlling device 102 notifies the managing device 101 of the I/O error information 121, as indicated by (ro_a2) in FIG. 1. The notification of the I/O error information 121 that is indicated by (ro_a2) in FIG. 1 may be executed before the restart of the I/O process that is indicated by (ro_a1) in FIG. 1. However, in order to immediately restart the I/O process, it is preferable that the restart of the I/O process and the notification of the I/O error information 121 be executed in the aforementioned order. If the VDISK is in the ro mode, the controlling device 102 does not determine the states of the first and second storage regions 103 and 104. The reason why the controlling device 102 does not determine the states is that if multiple controlling devices 102 detect errors of different surfaces, the erroneous surfaces are identified.

The controlling device 102 determines the states of the first and second storage regions 103 and 104 based on the I/O error information table 112 and the configuration DB 111 at the certain time intervals, as indicated by (ro_m1) in FIG. 1. The process indicated by (ro_m1) in FIG. 1 is the same as the process indicated by (rw_m1) in FIG. 1.

As described above, since the controlling device 102 restarts the I/O process without waiting for the determination of the states of the first and second storage regions 103 and 104 by the managing device 101, a time period from the occurrence of an error to the restart of the I/O process may be suppressed. Next, an example of the configuration of the storage system SM is described with reference to FIG. 2.

Figure 2:
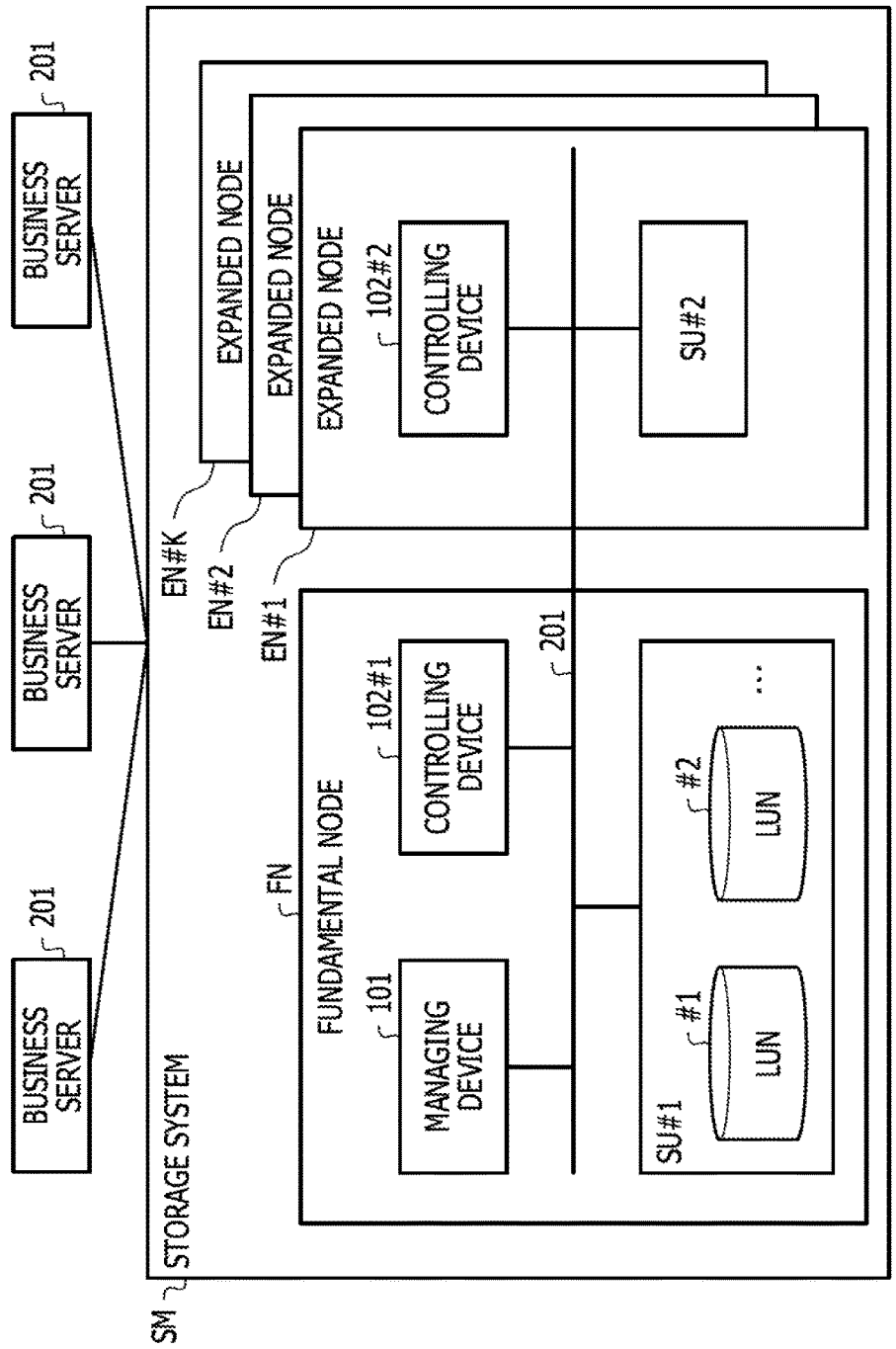
FIG. 2 is a diagram illustrating an example of the configuration of the storage system.

FIG. 2 is a diagram illustrating the example of the configuration of the storage system SM. The storage system SM includes a fundamental node FN and expanded nodes EN#1 to EN#K. In the following description, an arbitrary expanded node among the expanded nodes EN#1 to EN#K is referred to as an "expanded node EN#k" in some cases. The storage system SM is connected to one or more business servers 201.

The fundamental node FN includes the managing device 101, a controlling device 102#1, and an SU #1. The expanded node EN#1 includes a controlling device 102#2 and an SU #2. Similarly, each of expanded nodes EN#k includes a controlling device 102#k+1 and an SU #k+1.

For example, by adding an expanded node EN to the storage system SM, the whole performance and memory capacity of the storage system SM may be increased. Next, an example of a hardware configuration of each of the PUs is described.

Figure 3:
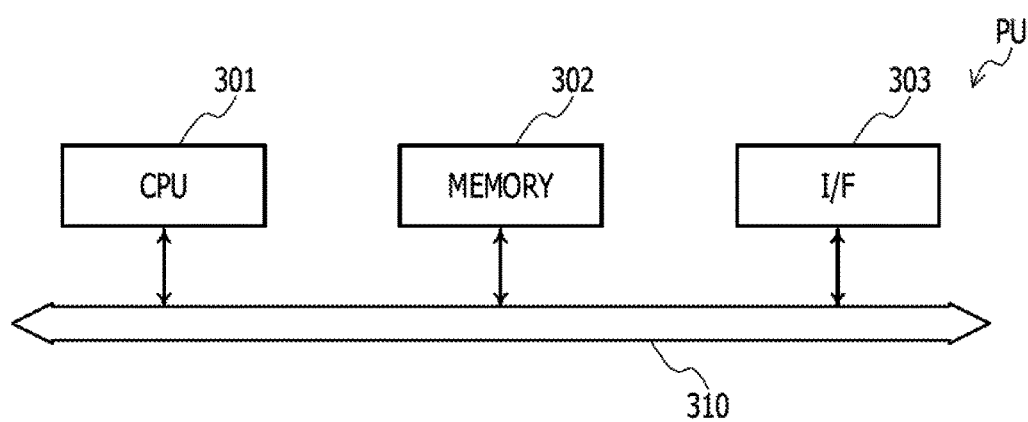
FIG. 3 is a diagram illustrating an example of a hardware configuration of each of PUs.

FIG. 3 is a diagram illustrating the example of the hardware configuration of each of the PUs. Referring to FIG. 3, each of the PUs includes a central processing unit (CPU) 301, a memory 302, and an interface (I/F) 303. The CPU 301, the memory 302, and the I/F 303 are connected to each other by a bus.

The CPU 301 controls the whole PU. The memory 302 includes a read only memory (ROM), a random access memory (RAM), a flash ROM, and the like, for example. Specifically, for example, the flash ROM stores programs such as an OS and firmware, the ROM stores an application program, and the RAM is used as a work area of the CPU 301. The programs stored in the memory 302 are loaded into the CPU 301 and thereby cause the CPU 301 to execute coded processes.

The I/F 303 controls input and output of data from and to another computer. For example, the I/F 303 is connected to a network such as a local area network (LAN), a wide area network (WAN), or the Internet via a communication line and connected to the other computer via the network. The I/F 303 serves as an internal interface with the network and controls the input and output from and to the other computer. The SUs illustrated in FIG. 2 may be achieved by the same hardware configuration as the PU.

An example of the configuration of the VDISK provided by the storage system SM is described below.

Figure 4:
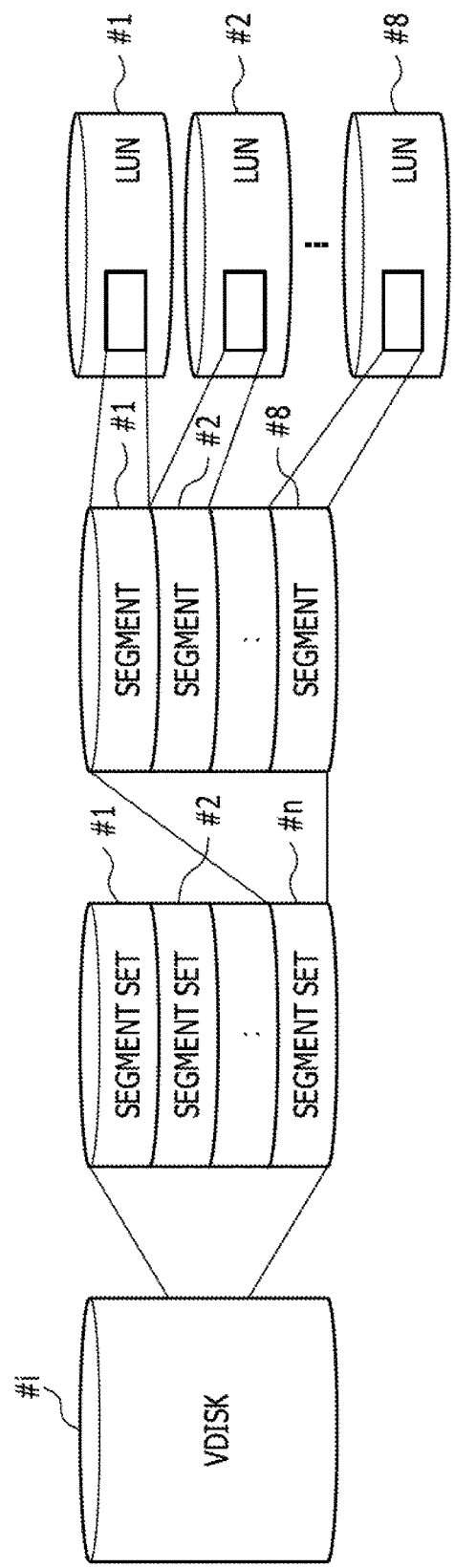
FIG. 4 is a diagram illustrating an example of the configuration of a VDISK.

FIG. 4 is a diagram illustrating the example of the configuration of the VDISK. Referring to FIG. 4, a VDISK #i is a group of multiple segment sets #1 to #n (i is a natural number and n is a natural number of 2 or larger). Each of the segment sets #1 to #n has a group of eight segments #1 to #8. Each of capacities of the segment sets #1 to #n is 2 GB, for example. Each of capacities of the segments #1 to #8 is 256 MB, for example.

The segments #1 to #8 are assigned to LUNs within an SU included in the storage system SM, respectively. User data is recorded per unit of fixed-length strip (1 MB). Strips are sectioned so that the segments #1 to #8 are used in the order from the segment #1 to the segment #8. In the following description, arbitrary LUNs to which segments that form the VDISK are assigned are referred to as "LUNs #j" in some cases.

Figure 5:
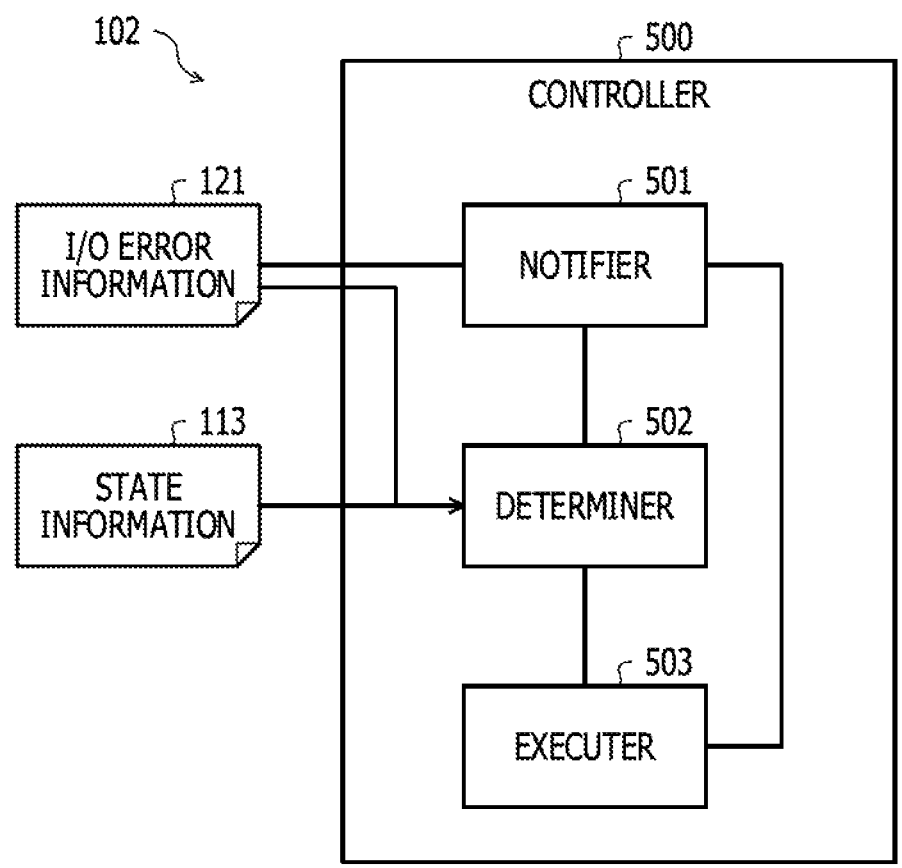
FIG. 5 is a diagram illustrating an example of a functional configuration of a controlling device.

FIG. 5 is a diagram illustrating an example of a functional configuration of the controlling device 102. The controlling device 102 includes a controller 500. The controller 500 includes a notifier 501, a determiner 502, and an executer 503. The controller 500 achieves functions of the sections 501 to 503 when the CPU 301 executes the programs stored in a storage device. The storage device is the memory 302 illustrated in FIG. 3 or the like. The results of processes by the sections are stored in a register of the CPU 301, a cache memory of the CPU 301, and the like.

The controlling device 102 may access the state information 113. The state information 113 indicates the states of the first and second storage regions 103 and 104 after the states of the first and second storage regions 103 and 104 are determined based on an error received by the managing device 101. The controlling device 102 receives the state information 113 from the managing device 101 and stores the received state information 113 in the memory 302.

Functions of the functional sections in a case where a segment in which an I/O error of the I/O process occurred is in the rw mode, and functions of the functional sections in a case where a segment in which an I/O error of the I/O process occurred is in the ro mode, are described below.

First, a case where the VDISK to which the first storage region 103 as a segment in which an I/O error occurred belongs is in the rw mode is described. The notifier 501 notifies the managing device 101 of the I/O error information 121 in response to the detection of the I/O error of the I/O process.

The determiner 502 determines the states of the first and second storage regions 103 and 104 based on the I/O error information 121 and the state information 113. For example, if the state information 113 indicates that the second storage region 104 that forms the pair with the first storage region 103 in which the error indicated in the I/O error information 121 occurred is valid, the determiner 502 determines that the first storage region 103 is invalid. On the other hand, if the second storage region 104 is invalid, the determiner 502 determines that the states of the first and second storage regions 103 and 104 are the same as the states indicated in the state information 113. The determiner 502 updates the state information 113 by reflecting the results of the determination in the state information 113.

The executer 503 executes the I/O process on the second storage region 104 or stops the I/O process based on the states determined by the determiner 502. For example, if the determiner 502 determines that the first storage region 103 is invalid, the executer 503 switches the region to be subjected to the I/O process to the second storage region 104 and restarts the I/O process. On the other hand, if the determiner 502 determines that the states of the first and second storage regions 103 and 104 are the same as the states indicated in the state information 113 or the second storage region 104 is invalid, the executer 503 stops the I/O process.

Next, a case where the VDISK to which the first storage region 103 as the segment in which the I/O error occurred belongs is in the ro mode is described. The notifier 501 notifies the managing device 101 of the I/O error information 121 in response to the detection of the I/O error of the I/O process.

The executer 503 executes the I/O process on the second storage region 104 in response to the detection of the I/O error of the I/O process.

If the VDISK to which the first storage region 103 as the segment in which the I/O error occurred belongs is in the ro mode, the determiner 502 does not execute the process. In this case, the controlling device 102 updates the state information 113 stored in the controlling device 102, based on the state information 113 notified by the managing device 101.

Figure 6:
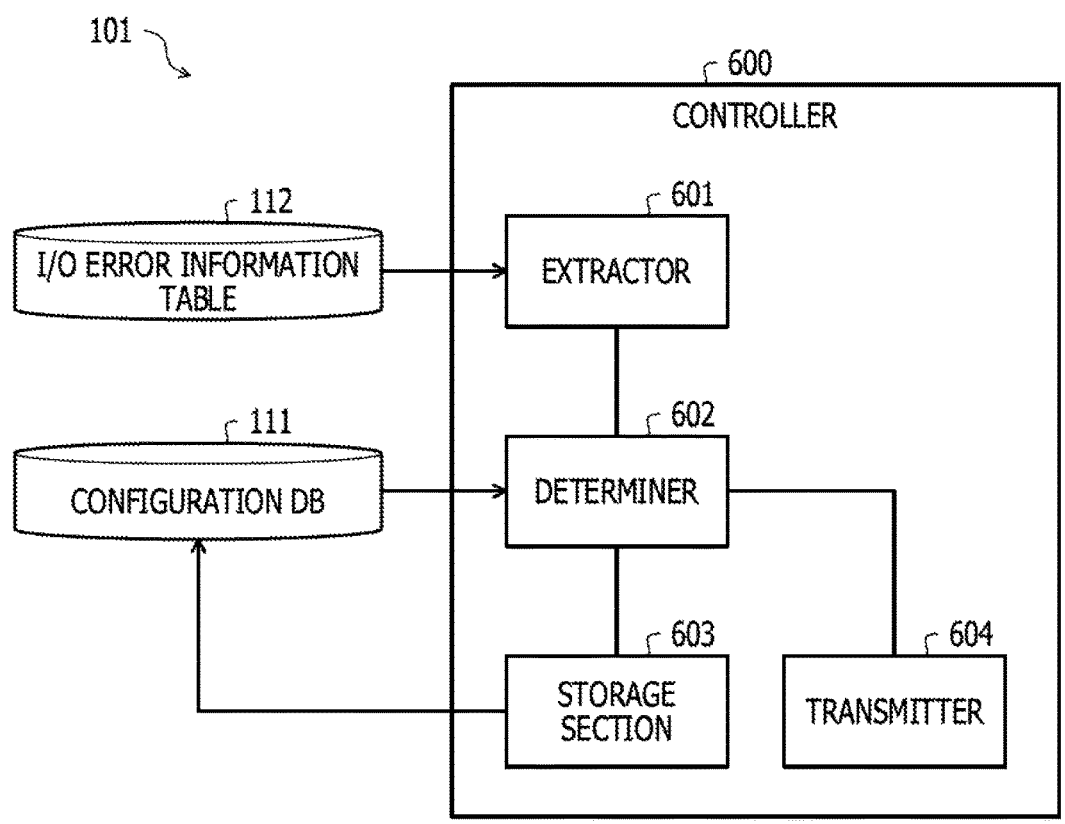
FIG. 6 is a diagram illustrating an example of a functional configuration of a managing device.

FIG. 6 is a diagram illustrating an example of a functional configuration of the managing device 101. The managing device 101 includes a controller 600. The controller 600 includes an extractor 601, a determiner 602, a storage section 603, and a transmitter 604. When the CPU 301 executes the programs stored in a storage device, the controller 600 achieves functions of the sections 601 to 604. The storage device is the memory 302 illustrated in FIG. 3, the SU #1, or the like, for example. The results of processes by the sections are stored in a register of the CPU 301, a cache memory of the CPU 301, and the like.

The managing device 101 may access the configuration DB 111 and the I/O error information table 112. The configuration DB 111 and the I/O error information table 112 are stored in the memory 302. The configuration DB 111 stores the states of the first and second storage regions 103 and 104. The I/O error information table 112 temporarily accumulates the I/O error information 121 from the controlling device 102. Data stored in the I/O error information table 112 are described later with reference to FIG. 8. Since a time period in which data is recorded results directly in a delay in restarting the I/O process, it is preferable that the data be stored in a storage device with high writing performance and I/O characteristics in which any transaction is not excluded upon writing or in which a time period for the transaction exclusion is minimized.

Next, functions of the functional sections that are related to a process to be executed on the I/O error information, and functions of the functional sections that are related to the VDISK generation, are described.

First, the functions that are related to the process to be executed on the I/O error information are described. The extractor 601 extracts the I/O error information 121 from the I/O error information table 112 at certain time intervals.

The determiner 602 determines the states of the first and second storage regions 103 and 104 based on the extracted I/O error information 121 and data stored in the configuration DB 111. For example, it is assumed that the extracted I/O error information 121 indicates an I/O error of the first storage region 103 and that the configuration DB 111 indicates that the first and second storage regions 103 and 104 are valid. In this case, the determiner 602 determines that the first storage region 103 is invalid. In addition, it is assumed that the extracted I/O error information 121 indicates multiple I/O errors, an I/O error of the first storage region 103 and an I/O error of the second storage region 104, and that the configuration DB 111 indicates that the first and second storage regions 103 and 104 are valid. In this case, the determiner 602 determines that a storage region in which an I/O error occurred earlier than an I/O error of the other storage region is invalid.

The storage section 603 causes the states determined by the determiner 602 to be stored in the configuration DB 111. Specifically, the storage section 603 causes the states determined by the determiner 602 to be stored in the configuration DB 111 in one transaction.

The transmitter 604 transmits, to the controlling device 102, the state information 113 after the determination that indicates the states determined by the determiner 602. In addition, if a VDISK to which a storage region as a segment in which an I/O error occurred belongs is in the ro mode, the transmitter 604 may transmit the state information 113 after the determination to the controlling device 102, and if the VDISK to which the storage region as the segment in which the I/O error occurred belongs is in the rw mode, the transmitter 604 may not transmit the state information 113 after the determination to the controlling device 102. In addition, upon the transmission of the state information 113, the transmitter 604 may transmit the state information 113 indicating states of two storage regions included in each segment group or may transmit information indicating the state of a segment that has been changed based on the determination.

Next, the functions related to the VDISK generation are described. For example, it is assumed that a request to generate a VDISK for the first and second storage regions 103 and 104 is received. For example, the request to generate the VDISK is provided by any of the controlling devices 102 #1 to #K+1 in response to the aforementioned request by the business server 201. The extractor 601 extracts the I/O error information 121 indicating I/O errors of the I/O process executed on the first and second storage regions 103 and 104 among errors received from the controlling device 102 within a predetermined time period. Then, the extractor 601 acquires the extracted I/O error information 121.

The determiner 602 determines the states of the first and second storage regions 103 and 104 based on the extracted I/O error information 121 and data stored in the configuration DB 111. Then, the transmitter 604 transmits, to the source of the request to generate the VDISK, the state information 113 after the determination that indicates the states determined by the determiner 602.

Figure 7:
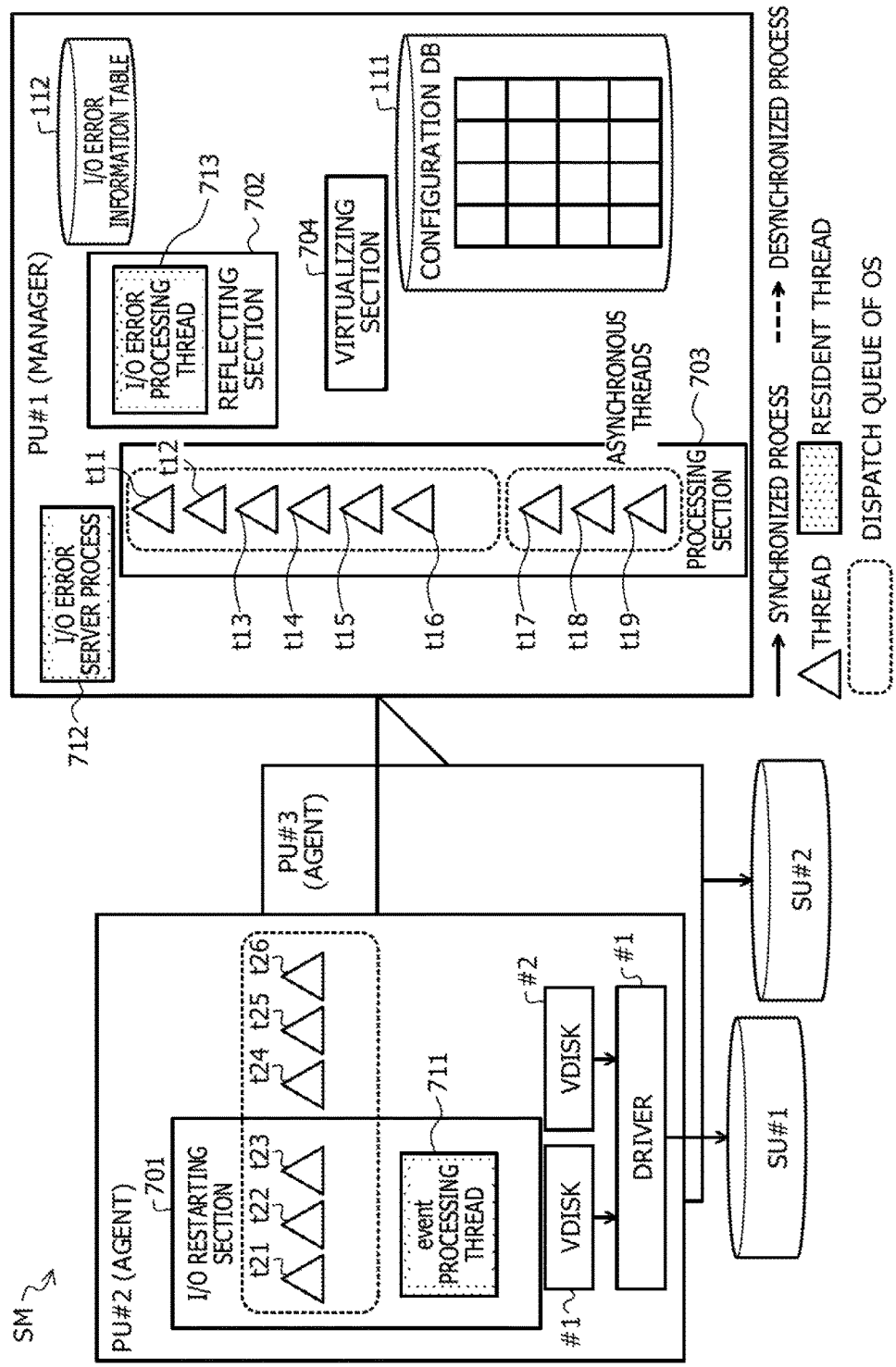
FIG. 7 is a diagram illustrating an example of a system configuration of the storage system according to the embodiment.

FIG. 7 is a diagram illustrating an example of a system configuration of the storage system SM according to the embodiment. Referring to FIG. 7, the storage system SM includes PUs #1 to #3 and SUs #1 and #2. For example, the PUs #1 and #2 are included in the fundamental node FN, and the PU #3 is included in the expanded node EN #1.

The PU #1 is a computer configured to control the PUs #2 and #3 and is a so-called "manager". The PUs #2 and #3 are computers configured to control the SUs #1 and #2 and are so-called "agents". Hereinafter, the PU #1 is referred to as the "manager", and the PUs #2 and #3 are referred to as the "agents".

In the storage system SM, a PU and an SU are treated as one set, and the whole storage region of the storage system SM is able to be expanded.

Each of the agents includes an I/O restarting section 701. The manager includes a reflecting section 702, a processing section 703, and a virtualizing section 704. Each of the agents executes an event processing thread 711 as a resident thread and executes a driver #1. In the example illustrated in FIG. 7, threads t21 to t26 are stored in a dispatch queue of an operating system (OS) executed on each of the agents. Similarly, threads t11 to t19 are stored in dispatch queues of an OS executed on the manager. The threads t17 to t19 are asynchronous threads.

The manager executes an I/O error server process 712 and an I/O error processing thread 713 as resident threads. The manager may access the configuration DB 111 and the I/O error information table 112.

Figure 9:
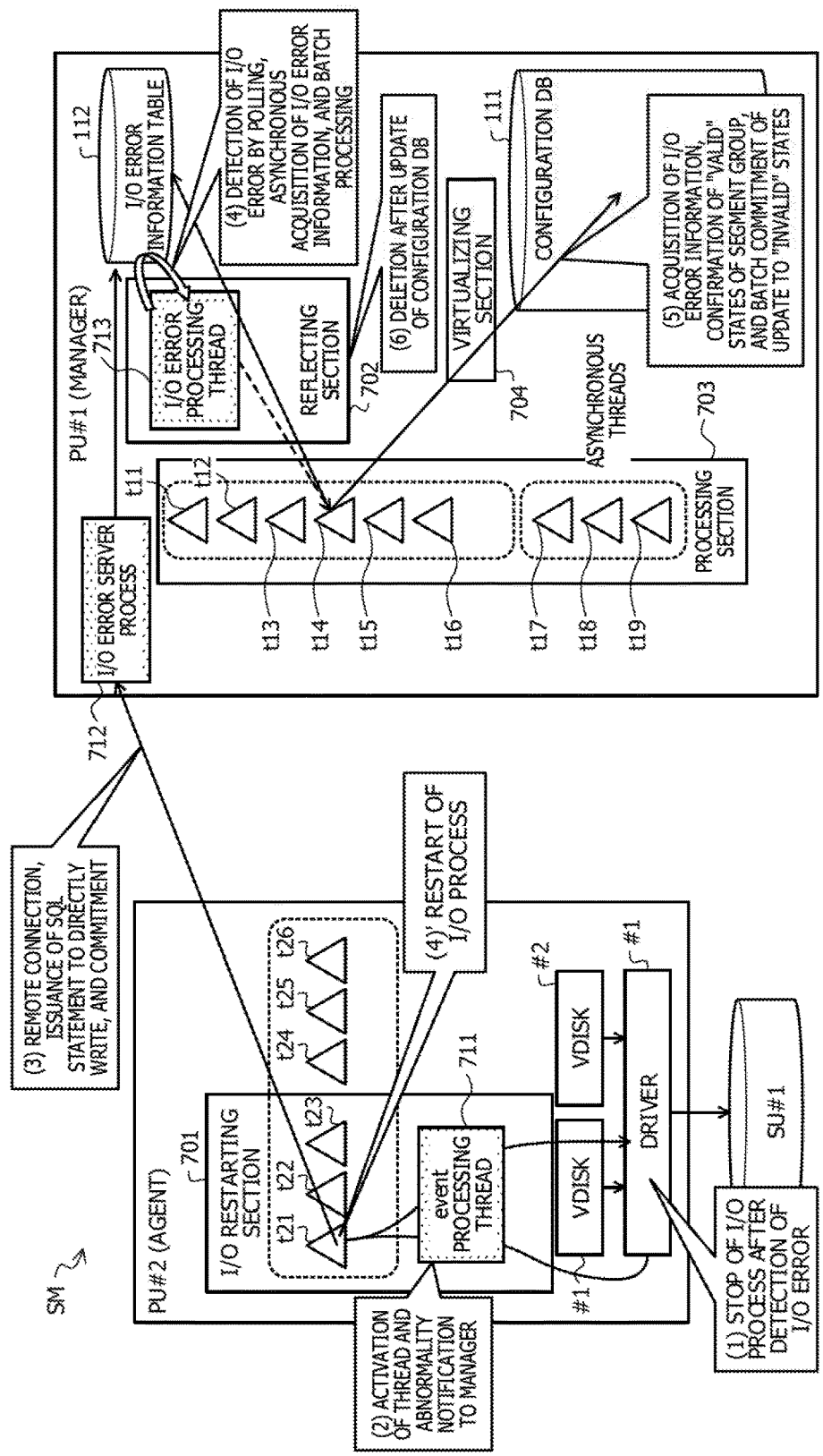
FIG. 9 is a diagram describing an example of operations executed upon the occurrence of an I/O error during an rw mode.
Figure 10:
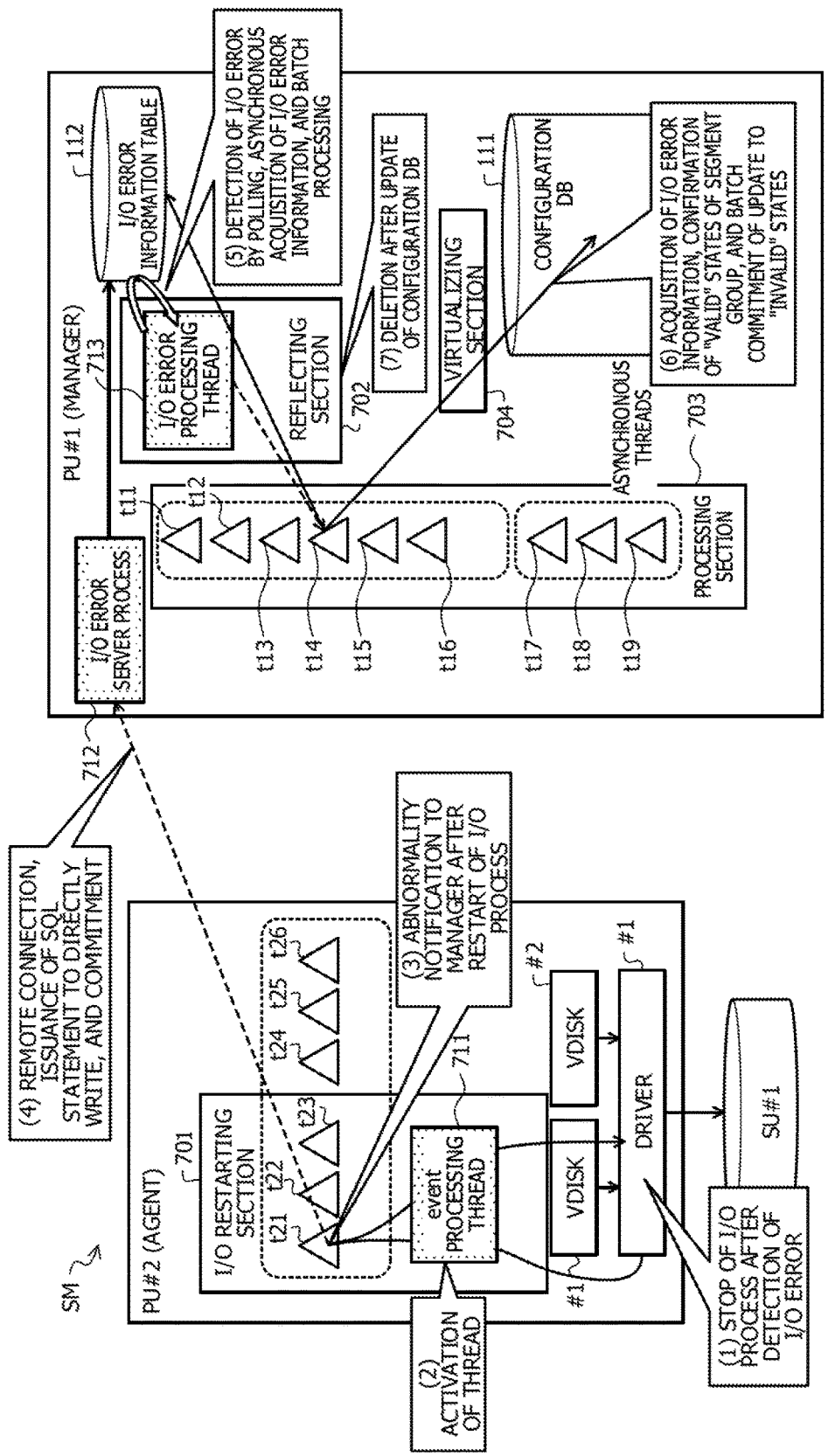
FIG. 10 is a diagram describing an example of operations executed upon the occurrence of an I/O error during an ro mode.

In FIGS. 7, 9, and 10, solid arrows indicate synchronous processes, and broken arrows indicate asynchronous processes. In FIGS. 7, 9, and 10, triangles indicate the treads, and hatched rectangles indicate the resident threads. In FIGS. 7, 9, and 10, broken line frames indicate the dispatch queues.

When detecting an I/O error of the I/O process issued to a lower-level unit, the I/O restarting section 701 temporarily stops the issued I/O process, registers I/O error information indicating the detected I/O error in the I/O error information table 112 of the manager, and restarts the I/O process.

The reflecting section 702 extracts the I/O error information 121 accumulated in the I/O error information table 112 and collectively reflects the extracted I/O error information 121 in the configuration DB 111.

The processing section 703 receives an instruction to generate a VDISK, an instruction to delete a VDISK, and the like from an external and executes processes in accordance with information stored in the configuration DB 111. In addition, the processing section 703 provides an instruction to the agents.

The virtualizing section 704 determines information on the latest VDISKs based on the I/O error information accumulated in the I/O error information table 112 and the configuration DB 111 and instructs the agents to generate the latest VDISKs. In addition, as a normal VDISK generation process, the virtualizing section 704 extracts access modes of the VDISKs and information on all segments forming the VDISKs from the configuration DB 111 and transmits the extracted access modes and the extracted information to the agents. The information on all the segments indicate information on the positions of the segments in the VDISKs or segment group indices, information on the positions of the segments within pairs of LUNs forming mirror surfaces or IDs of the LUNs and segment indices of the segments within the LUNs.

When receiving the detection of an I/O error from the driver #1, the event processing thread 711 notifies the manager of the I/O error.

The driver #1 is a device driver that controls the SU #1 and forms a VDISK. In the example illustrated in FIG. 7, the driver #1 forms VDISKs #1 and #2. In addition, the driver #1 detects an I/O error and notifies the event processing thread 711 of the detected I/O error.

The I/O error server process 712 is a process that receives I/O errors from the agents.

The I/O error processing thread 713 is a thread that detects the I/O errors by polling from the I/O error information table 112 and processes the I/O errors.

Figure 8:
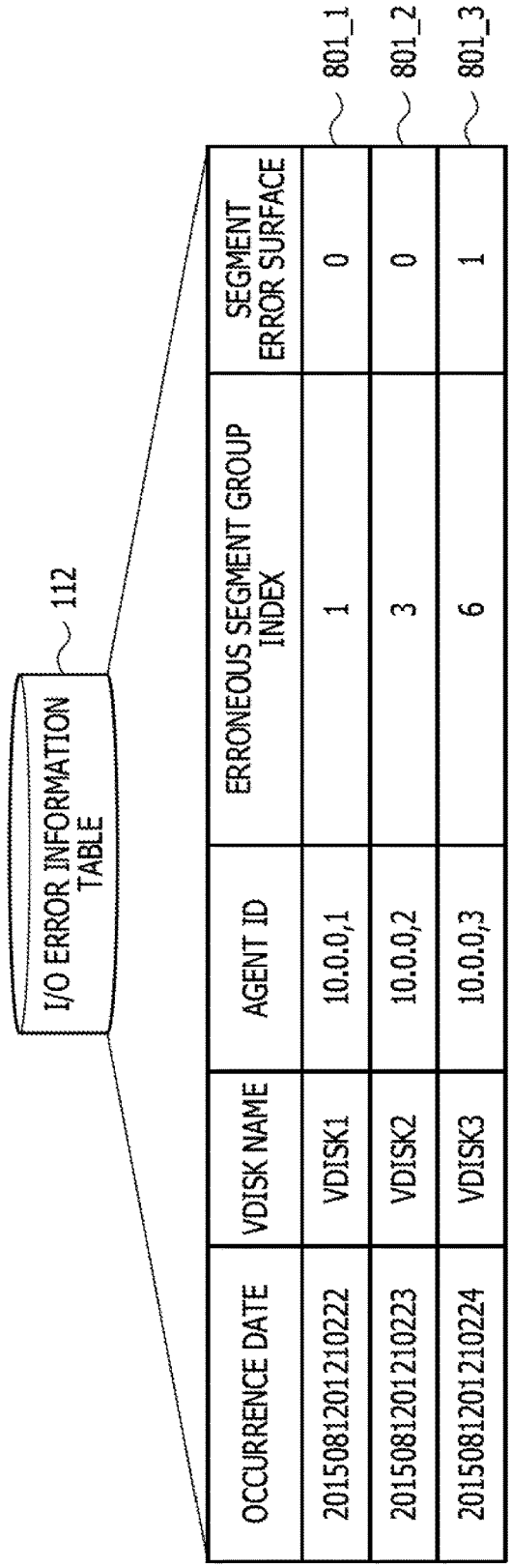
FIG. 8 is a diagram illustrating an example of data stored in an I/O error information table.

FIG. 8 is a diagram illustrating an example of data stored in the I/O error information table 112. The I/O error information table 112 illustrated in FIG. 8 includes records 801_1 to 801_3. The I/O error information table 112 includes an occurrence date field, a VDISK name field, an agent ID field, an erroneous segment group index field, and a segment error surface field.

In the occurrence date field, information that indicates times and dates when I/O errors occurred are stored. In the VDISK name field, the names of VDISKs are stored as information identifying the VDISKs to which segments in which the I/O errors occurred belong. In the agent ID field, information that identifies agents that detect the I/O errors is stored. In the erroneous segment group index field, information that identifies segment groups to which the segments in which the I/O errors occurred belong is stored. In the segment error surface field, information that identifies the segments that belong the segment groups and in which the I/O errors occurred is stored. Specifically, in the segment error surface field, 0 or 1 that indicates a number of a segment surface is stored as information identifying a segment that is among two segments included in a segment group and in which an I/O error occurred.

For example, it is assumed that a number of a segment surface of a segment in which an I/O error occurred is 0. In this case, the segment in which the I/O error occurred corresponds to the first storage region 103 illustrated in FIG. 1, and a segment of which a number of a segment surface is 1 and that has the same segment group index as the segment in which the I/O error occurred corresponds to the second storage region 104.

FIG. 9 is a diagram describing an example of operations executed upon the occurrence of an I/O error during the rw mode. As indicated by (1) in FIG. 9, when accessing a segment within the SU #1, the driver #1 that received an access request from the thread t21 detects the I/O error and stops the I/O process after the detection.

Next, as indicated by (2) in FIG. 9, when receiving an I/O abnormality notification from the driver #1, the I/O restarting section 701 activates the thread t21 and transmits the abnormality notification to the manager as a restart process.

Then, as indicated by (3) in FIG. 9, the thread t21 is remotely connected to the I/O error server process 712, issues an SQL statement to write the I/O error information 121 directly in the I/O error information table 112, and commits the writing. Then, as indicated by (4)' in FIG. 9, the thread t21 restarts the I/O process.

Next, as indicated by (4) in FIG. 9, the reflecting section 702 detects the I/O error by polling by the I/O error server process 712 as a reflection process. Then, the I/O error server process 712 asynchronously acquires the I/O error information and executes batch processing on the acquired I/O error information. In the example illustrated in FIG. 9, the I/O error server process 712 activates the thread t14 as a thread that executes a part of the reflection process.

Then, as indicated by (5) in FIG. 9, the thread t14 acquires the I/O error information, confirms "valid" states of a segment group, and collectively commits the update of the segment states to "invalid" states.

Next, as indicated by (6) in FIG. 9, the reflecting section 702 updates the configuration DB 111 and deletes a record of the I/O error information table 112 after the update as the reflection process.

FIG. 10 is a diagram describing an example of operations executed upon the occurrence of an I/O error during the ro mode. As indicated by (1) in FIG. 10, when accessing a segment within the SU #1, the driver #1 that received an access request from the thread t21 detects the I/O error and stops the I/O process after the detection.

Next, as indicated by (2) in FIG. 10, when receiving an I/O abnormality notification from the driver #1, the I/O restarting section 701 activates the thread #21 as the restart process. Then, as indicated by (3) in FIG. 10, the I/O restarting section 701 restarts the I/O process and transmits the abnormality notification to the manager after the restart.

Then, as indicated by (4) in FIG. 10, the thread t21 is remotely connected to the I/O error server process 712, issues an SQL statement to write the I/O error information 121 directly in the I/O error information table 112, and commits the writing. Processes indicated by (5) to (7) in FIG. 10 are the same as the processes indicated by (4) to (6) in FIG. 9, and a description thereof is omitted.

Next, the restart process to be executed by the I/O restarting section 701 is described. When detecting an I/O error of the I/O process issued to a lower-level unit, the I/O restarting section 701 temporarily stops the issued I/O process. Then, the process is branched based on an access mode of a VDISK. If the VDISK is in the rw mode, the I/O restarting section 701 does not restart the I/O process before a notification to the manager. On the other hand, if the VDISK is in the ro mode, the I/O restarting section 701 restarts the I/O process before the notification to the manager. Next, a flowchart that indicates the restart process is described based on the above description with reference to FIG. 11.

Figure 11:
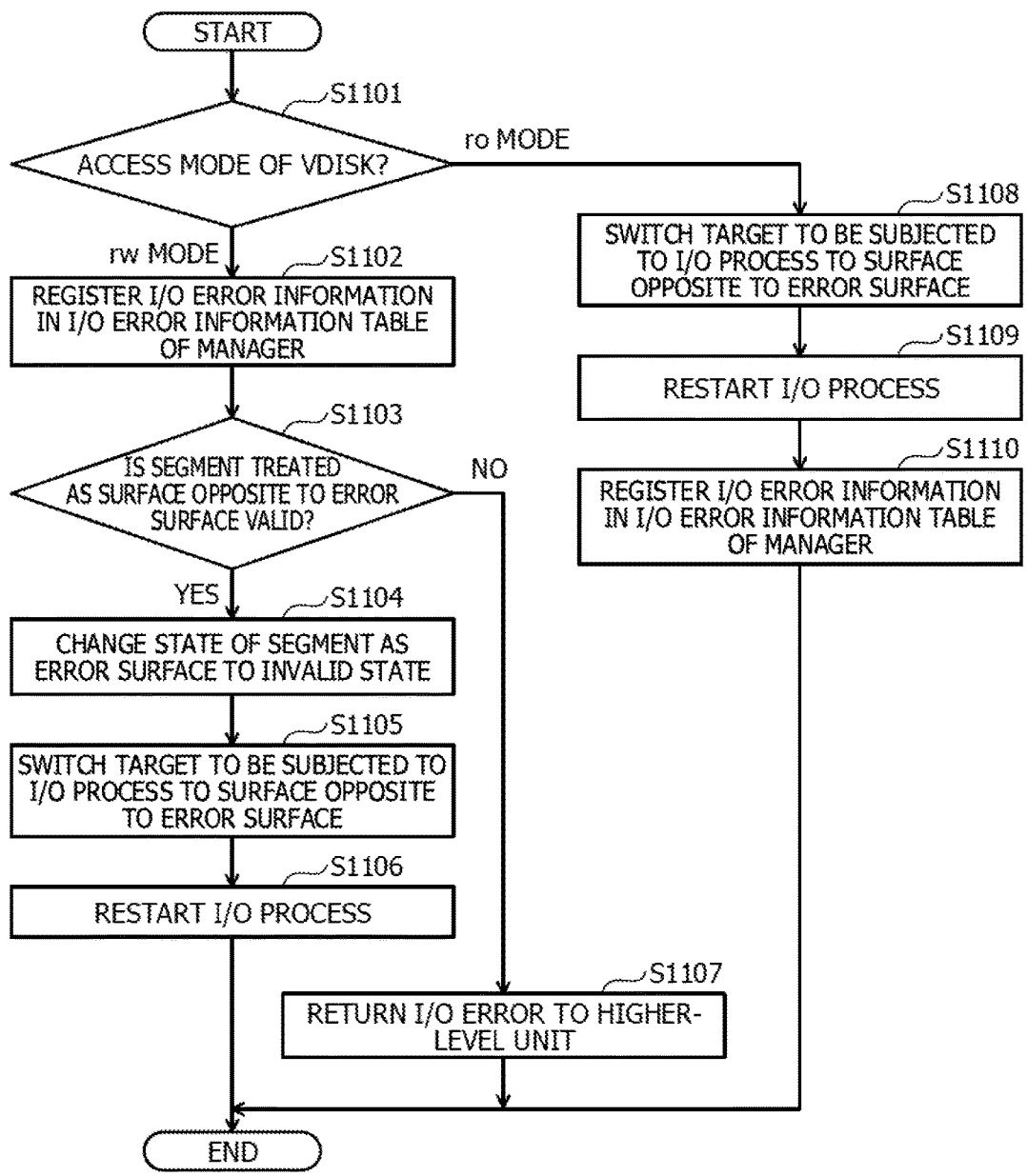
FIG. 11 is a flowchart of an example of a restart process procedure.

FIG. 11 is the flowchart of an example of a procedure for the restart process. An agent confirms the access mode of the VDISK (in step S1101). If the access mode of the VDISK is the rw mode (rw mode in step S1101), the agent registers the I/O error information 121 in the I/O error information table 112 of the manager (in step S1102). Then, the agent determines whether or not a segment as a surface opposite to an error surface is valid (in step S1103).

If the segment as the surface opposite to the error surface is valid (Yes in step S1103), the agent changes, to the invalid state, the state of a segment as the error surface (in step S1104). Then, the agent switches a target to be subjected to the I/O process to the surface opposite to the error surface (in step S1105). Then, the agent restarts the I/O process (in step S1106).

If the segment as the surface opposite to the error surface is invalid (No in step S1103), the agent returns the I/O error to a higher-level unit (in step S1107).

If the access mode of the VDISK is the ro mode (ro mode in step S1101), the agent switches the target to be subjected to the I/O process to the surface opposite to the error surface (in step S1108). Then, the agent restarts the I/O process (in step S1109). Then, the agent registers the I/O error information 121 in the I/O error information table 112 of the manager (in step S1110).

After any of the processes of steps S1106, S1107, and S1110 is terminated, the agent terminates the I/O restart process. By executing the I/O restart process, the agent restarts the I/O process without the determination of the state of a segment by the manager. Especially, if the VDISK is in the ro mode, a time period from the occurrence of the I/O error to the restart of the I/O process may be reduced by the execution of the restart of the I/O process before the registration of the I/O error information 121. The reason why the state of the segment is not changed before the restart of the I/O process is that an abnormality of the segment is finally determined by the manager and an error surface is determined in a case where multiple agents simultaneously detect errors of different surfaces.

Next, the reflection process to be executed by the reflecting section 702 is described. The reflecting section 702 periodically extracts the I/O error information 121 accumulated in the I/O error information table 112, determines the states of segments based on the extracted I/O error information 121 and data stored in the configuration DB 111, and reflects the determined states in the configuration DB 111. If the VDISK is in the ro mode, the reflecting section 702 notifies the agent of the changed state of the segment. Then, the reflecting section 702 deletes the I/O error information 121 accumulated in the I/O error information table 112. Next, an example of stored data of a state change notification list to be used to notify an agent of a changed state of a segment is described with reference to FIG. 12.

Figure 12:
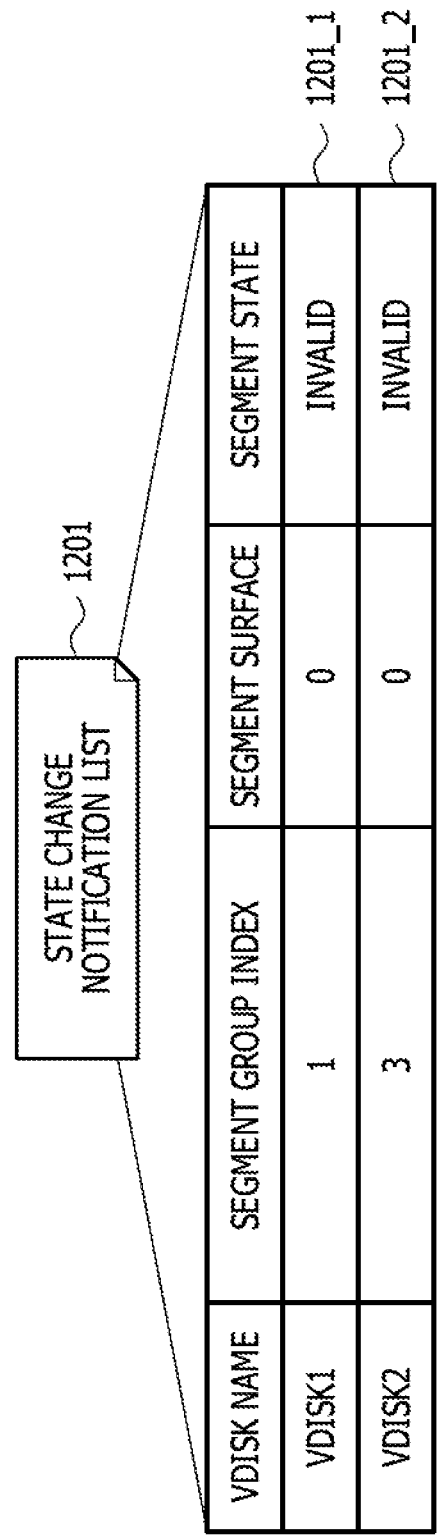
FIG. 12 is a diagram illustrating an example of data stored in a state change notification list.

FIG. 12 is a diagram illustrating the example of the stored data of the state change notification list 1201. The state change notification list 1201 illustrated in FIG. 12 includes records 1201_1 and 1201_2. The state change notification list 1201 includes a VDISK name field, a segment group index field, a segment surface field, and a segment state field.

In the VDISK name field, the names of VDISKs are stored as information identifying the VDISKs to which segments whose states have been changed belong. In the segment group index field, information that identifies segment groups to which the segments whose states have been changed belong is stored. In the segment surface field, information that identifies the segments that belong to the segment groups and whose states have been changed is stored. In the segment state field, identifies that indicate the changed states of the segments are stored.

Figure 13:
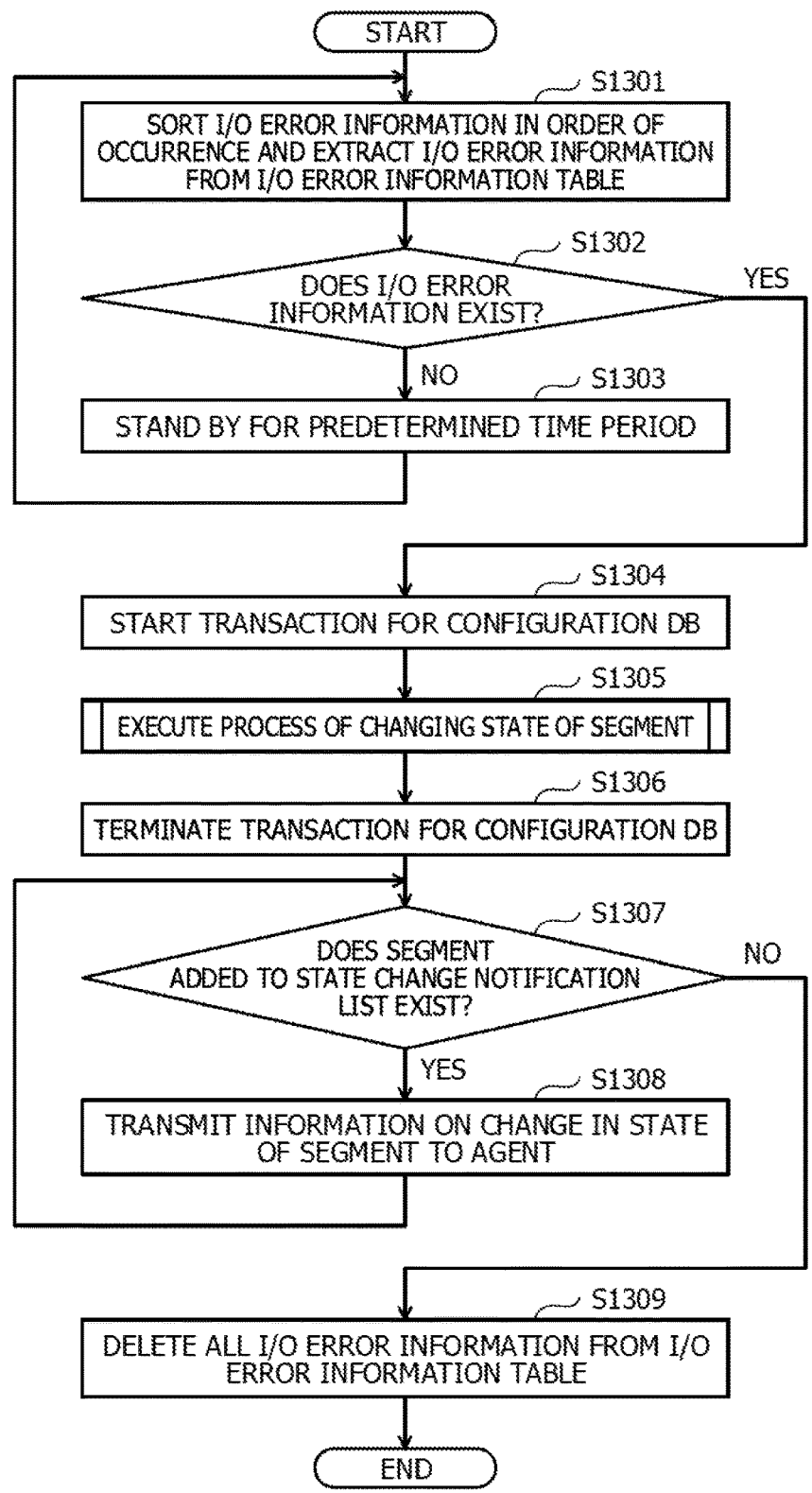
FIG. 13 is a flowchart of an example of a reflection process procedure.

FIG. 13 is a flowchart of an example of a procedure for the reflection process. The manager sorts the I/O error information 121 in the order of the occurrence of I/O errors and extracts the I/O error information 121 from the I/O error information table 112 (in step S1301). Then, the manager determines whether or not the I/O error information 121 exists (in step S1302). If the I/O error information does not exist (No in step S1302), the manager stands by for a predetermined time period (in step S1303). Then, the manager causes the process to return to the process of step S1301.

If the I/O error information 121 exists (Yes in step S1302), the manager starts a transaction for the configuration DB 111 (in step S1304). Then, the manager executes a process of changing the state of a segment (in step S1305). Next, the manager terminates the transaction for the configuration DB 111 (in step S1306). Then, the manager determines whether or not a segment added to the state change notification 1201 exists (in step S1307).

If the segment added to the state change notification 1201 exists (Yes in step S1307), the manager transmits information on a change in the state of the segment to an agent (in step S1308). On the other hand, if the segment added to the state change notification 1201 does not exist (No in step S1307), the manager deletes all the I/O error information 121 from the I/O error information table 112 (in step S1309). After the process of step S1309 is terminated, the manager terminates the reflection process.

Figure 14:
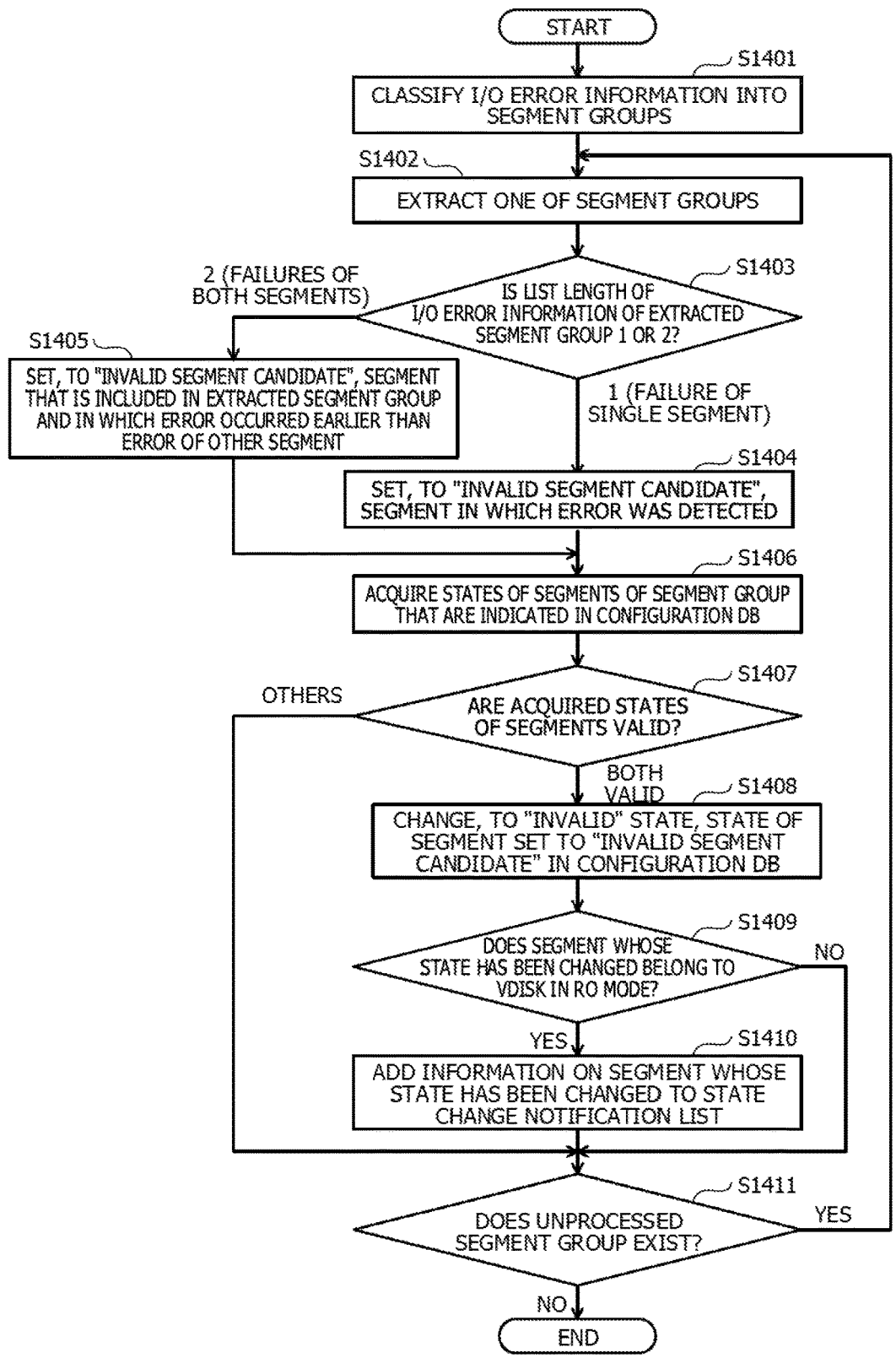
FIG. 14 is a flowchart of an example of a procedure for a process of changing the state of a segment.

FIG. 14 is a flowchart of an example of a procedure for the process of changing the state of a segment. The manager classifies the I/O error information 121 into segment groups (in step S1401). In this case, the manager sorts the I/O error information 121 in the order of the occurrence of the I/O errors.

Next, the manager extracts one of the segment groups (in step S1402). Then, the manager confirms a list length of I/O error information 121 on the extracted segment group (in step S1403).

If the list length is 1 or a single segment fails (1 (a failure of the single segment) in step S1403), the manager sets, to an "invalid segment candidate", the segment in which an I/O error was detected (in step S1404). If the list length is 2 or both segments fail (2 (failures of both segments) in step S1403), the manager sets, to the "invalid segment candidate", a segment that is included in the extracted segment group and in which an I/O error occurred earlier than an I/O error that occurred in the other segment (in step S1405).

After the process of step S1405 or the process of step S1405 is terminated, the manager acquires the states of the segments of the segment group that are indicated in the configuration DB 111 (in step S1406). Then, the manager confirms the acquired states of the segments (in step S1407).

If the acquired states of the segments are the valid states (both valid in step S1407), the manager sets the state of the segment set to the "invalid segment candidate" in the configuration DB 111 to the "invalid" state (in step S1408). Then, the manager determines whether or not the segment whose state has been changed belongs to a VDISK that is in the ro mode (in step S1409). If the segment whose state has been changed belongs to the VDISK that is in the ro mode (Yes in step S1409), the manager adds, to the state change notification list 1201, information on the segment whose state has been changed (in step S1410).

Then, the manager determines whether or not an unprocessed segment group exists (in step S1411). If the states of the segments are others, or one of the segments is valid and the other segment is invalid or the segments are invalid (others in step S1407), or if the segment whose state has been changed belongs to the VDISK that is in the rw mode (No in step S1409), the manager causes the process to proceed to the process of step S1411.

If the unprocessed segment group exists (Yes in step S1411), the manager causes the process to return to the process of step S1402. On the other hand, if the unprocessed segment group does not exist (No in step S1411), the manager terminates the process of changing the state of a segment.

It is assumed that, after the configuration DB 111 is updated and the update is committed, the manager is forcibly shut down in a state in which the I/O error information 121 is not deleted. In this case, if the manager executes the process illustrated in FIG. 14, a segment whose state has been changed to the invalid state in the configuration DB 111 has a higher priority, and consistency may be taken for the segment that is in the invalid state.

As described above, the manager uniquely determines the state of a segment after a change in the state based on the occurrence of an I/O error and the state of the segment. In addition, the manager collectively reflects the changed state in the configuration DB 111 in a single transaction. Transaction competition that has traditionally caused an increase in a load together with an increase in the number of I/O errors causes a load equivalent with a load applied in a normal state or a load applied due to a single transaction. Thus, the manager may suppress a load. Intervals at which the I/O error information is extracted from the I/O error information table 112 are equal to or close to 10 seconds. If the switching is executed due to up to several thousand I/O errors, a time period for the reflection of the I/O error information 121 in the configuration DB 111 is up to approximately several seconds.

Next, a virtualization process to be executed by the virtualizing section 704 is described. All segments that are included in a VDISK and into which data is able to be read are to be in the latest states upon the VDISK generation. Thus, the I/O error information 121 is virtually reflected in the configuration DB 111, and the manager transmits information indicating the states of the segments to an agent connected to the manager. Specifically, upon the VDISK generation, the virtualizing section 704 chronologically extracts the I/O error information 121 for the volume from the I/O error information table 112. A method of virtually reflecting the extracted I/O error information 121 in the configuration DB 111 is the same as or very similar to the process of changing the state of a segment. Next, an example of data stored in a latest segment state list or specific data indicating the states of the segments and to be transmitted to the agent connected to the manager is described with reference to FIG. 15.

Figure 15:
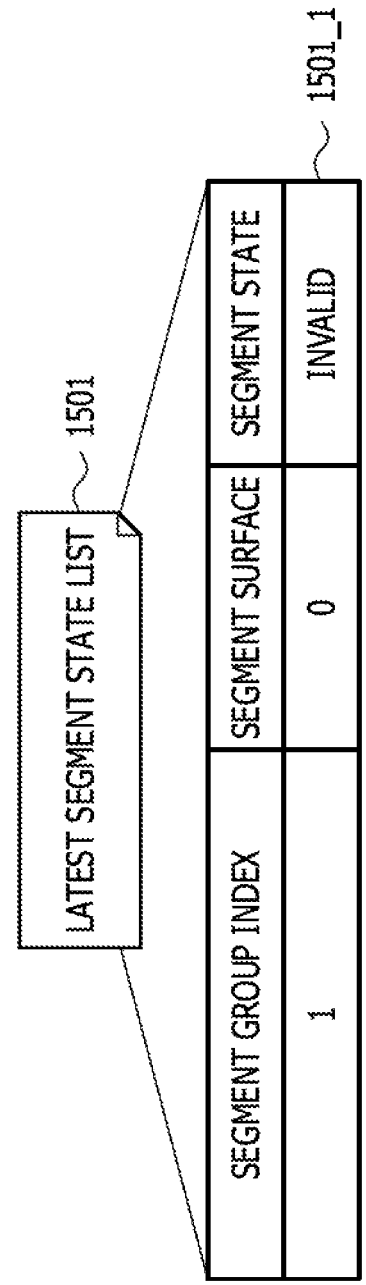
FIG. 15 is a diagram illustrating an example of data stored in a latest segment state list.

FIG. 15 is a diagram illustrating an example of the data stored in the latest segment state list 1501. The latest segment state list 1501 includes a record 1501_1. The latest segment state list 1501 includes a segment group index field, a segment surface field, and a segment state field.

In the segment group index field, information that identifies a segment group to which a segment in the latest state belongs is stored. In the segment surface field, information that identifies the segment in the latest state is stored. In the segment state field, an identifier that identifies the latest state of the segment is stored.

Figure 16:
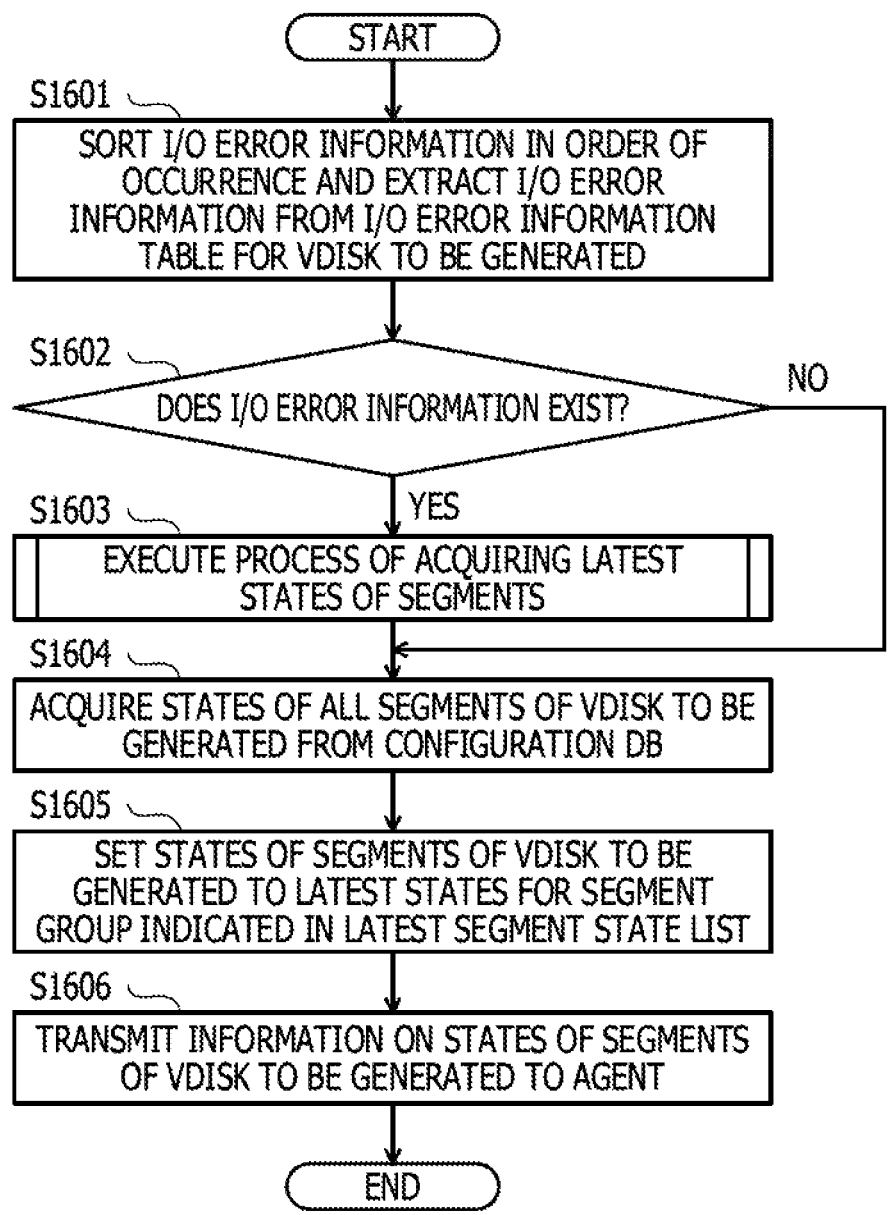
FIG. 16 is a flowchart of an example of a virtualization process procedure.

FIG. 16 is a flowchart of an example of a procedure for the virtualization process. The manager sorts the I/O error information 121 in the order of the occurrence of I/O errors for a VDISK to be generated and acquires the I/O error information 121 from the I/O error information table 112 (in step S1601). Then, the manager determines whether or not the I/O error information 121 exists (in step S1602). If the I/O error information 121 exists (Yes in step S1602), the manager executes a process of acquiring the latest states of segments (in step S1603).

After the termination of the process of step S1603 or if the I/O error information 121 does not exist (No in step S1603), the manager acquires, from the configuration DB 111, the states of all the segments of the VDISK to be generated (in step S1604). Then, the manager sets the states of the segments of the VDISK to be generated to the latest states for a segment group indicated in the latest segment state list 1501 (in step S1605). Then, the manager transmits, to an agent, information on the states of the segments of the VDISK to be generated (in step S1606). After the termination of the process of step S1606, the manager terminates the virtualization process.

Figure 17:
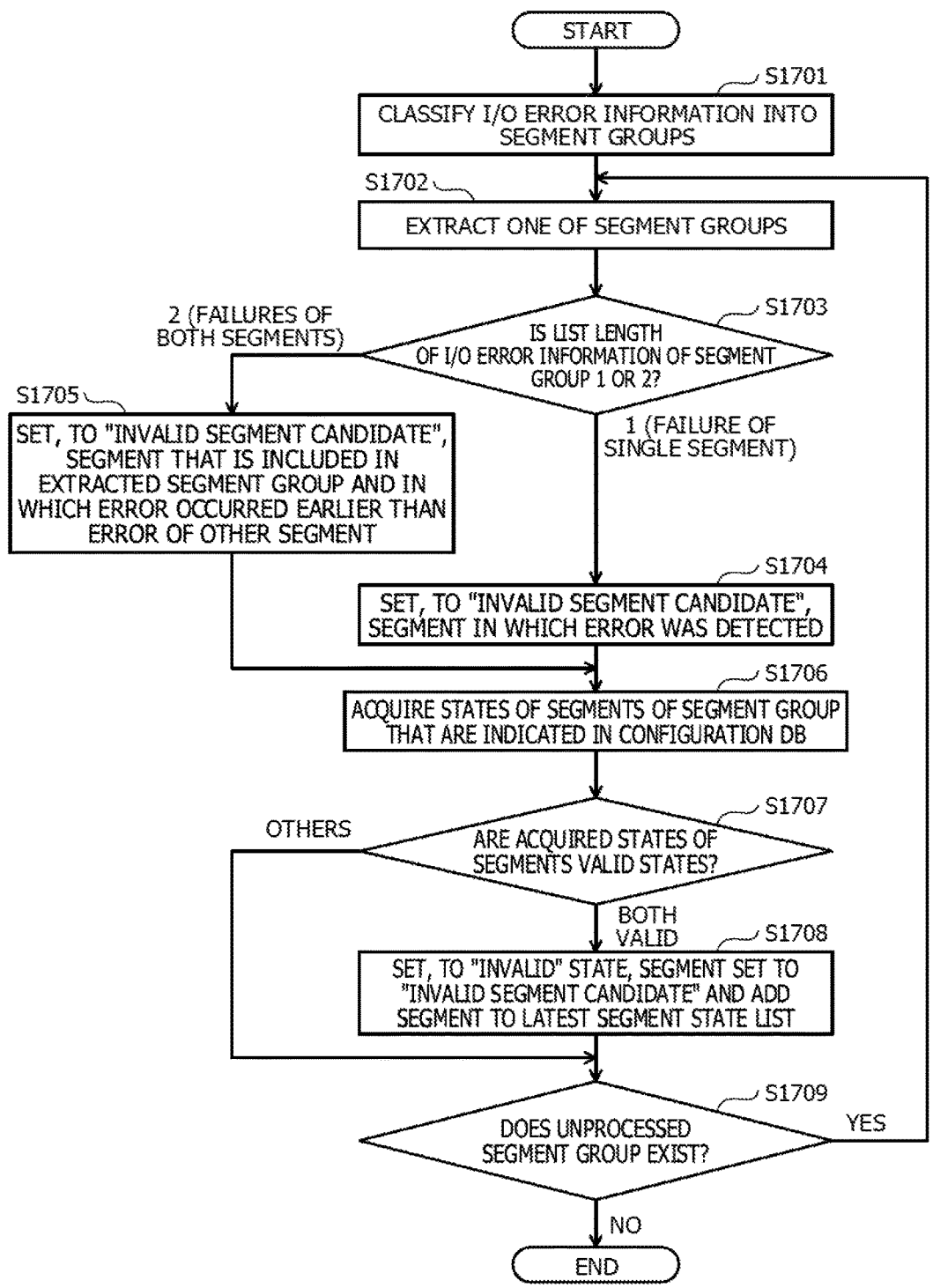
FIG. 17 is a flowchart of an example of a procedure for a process of acquiring the latest states of segments.

FIG. 17 is a flowchart of an example of a procedure for the process of acquiring the latest states of segments. Processes of steps S1701 to S1707 illustrated in FIG. 17 are the same as the processes of steps S1401 to S1407, and a description thereof is omitted.

If both acquired states of the segments are the valid states (both valid in step S1707), the manager sets, to the "invalid" state, the state of the segment set to the "invalid segment candidate" and adds information on the segment to the latest segment state list 1501 (in step S1708).

After the termination of the process of step S1708 or if the states of the segments are others (others in step S1707), the manager determines whether or not an unprocessed segment group exists (in step S1709). If the unprocessed segment group exists (Yes in step S1709), the manager causes the process to return to the process of step S1702. On the other hand, if the unprocessed segment group does not exist (No in step S1709), the manager terminates the process of acquiring the latest states of segments.

As described above, if a VDISK to which a segment in which an I/O error occurred belongs is in the rw mode, an agent determines the states of segments of a segment group and restarts or stops the I/O process, and if the VDISK is in the ro mode, the agent restarts the I/O process. Thus, the agent restarts the I/O process without waiting for the determination of the states of the segments of the segment group by the manager, and a time period from the occurrence of the I/O error to the restart of the I/O process may be suppressed. For example, even if a large number of I/O errors occur in a large environment, the agents may avoid timeouts of I/O of the business servers 201. In addition, in the same environment, while response performance is maintained, a user operation may be processed. Thus, the availability of the whole storage system SM may be ensured.

In addition, if a VDISK to which a segment in which an I/O error occurred belongs is in the rw mode, and a segment that forms a pair with the segment in which the I/O error occurred is valid, an agent determines that the segment in which the I/O error occurred is invalid. Thus, the agents may make the determination, to be normally made by the manager, of the states of segments and restart the I/O process.

In addition, the state information 113 indicates the states of segments of segment groups based on an I/O error received by the manager. Thus, the agents may recognize the states of the segments of the segment groups before the occurrence of the I/O error.

In addition, the manager determines the states of the segments of the segment groups based on data stored in the I/O error information table 112 and the configuration DB 111 at predetermined time intervals and collectively stores the states after the determination in the configuration DB 111. Thus, the manager may minimize a time period for a transaction executed on the configuration DB 111. Thus, even if a large number of I/O errors occur in a large environment, the manager may return an I/O request from a business server 201 and improve the throughput of the I/O process by the manager while maintaining the performance of the storage system at a certain level.

In addition, it is assumed that an I/O error received from an agent within a predetermined time period is an I/O error of a certain segment and that the states of segments of a segment group including the certain segment are the valid states in the configuration DB 111. In this case, the manager determines that the state of the certain segment is the valid state. In this configuration, the manager may achieve desynchronization of the reflection in the configuration DB 111.

In addition, if a VDISK to which a segment in which an I/O error occurred belongs is in the ro mode, the manager transmits information on the state of the segment after the determination, and if the VDISK is in the rw mode, the manager may not transmit the information on the state of the segment after the determination. If the VDISK is in the rw mode, an agent determines the state of the segment and the manager may not transmit the information on the state of the segment after the determination. If the VDISK to which the segment in which the I/O error occurred belongs is in the ro mode, the manager may reduce a load applied due to the transmission of the state information 113 to the agent. In addition, the manager may not determine the VDISK to which the segment in which the I/O error occurred belongs, and the manager may transmit the information on the state of the segment after the determination. If the VDISK is in the rw mode, the agent determines the state of the segment and writes, over information, the same information as the information over which the information is to be written, and a failure may not occur.

In addition, in response to the reception of a request to generate a VDISK, the manager extracts, from the I/O error information table 112, information on an I/O error of the VDISK requested to be generated and transmits, to a source of the request, information on a segment's state determined based on the extracted information and the configuration DB 111. Thus, the source of the request recognizes that the extracted information on the I/O error is virtually reflected in the configuration DB 111, and the source of the request executes an operation on the VDISK in the same manner as a normal operation.

The control method and the management method that are described in the embodiment may be achieved by causing a computer such as a personal computer or a workstation to execute prepared programs. The control program and the management program are stored in a computer-readable recording medium such as a hard disk, a flexible disk, a compact disc-read only memory (CD-ROM), a digital versatile disc (DVD) and are read from the recording medium by the computer and executed by the computer. The control program and the management program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention. For example, the steps recited in any of the method or process descriptions may be executed in any order and are not limited to the order presented.

What is claimed is:

1. A controlling device comprising:
   a memory; and
   a processor coupled to the memory and configured to
   receive state information indicating a state of a first storage region and a state of a second storage region for storing data mirrored from the first storage region, from a managing device that manages the states of the first and second storage regions,
   detect an error of an input and output process executed on the first storage region,
   execute, in response to the detection of the error, a first process if an access mode for the first storage region is a mode in which reading and writing are enabled, the first process including notifying the managing device of the error, determining the states of the first and second storage regions based on the error and the state information, and selecting, based on the determined states, either one of executing the input and output process on the second storage region or stopping the input and output process executed on the first and second storage regions, and
   execute, in response to the detection of the error, a second process if the access mode for the first storage region is a mode in which the reading is enabled and the writing is disabled, the second process including executing the input and output process on the second storage region and notifying the managing device of the error.

2. The controlling device according to claim 1, wherein the first process executed by the processor includes:
   determining, if the state information indicates that the second storage region is in a normal state, that the first storage region is in an abnormal state; and
   executing the input and output process on the second storage region.

3. The controlling device according to claim 2, wherein the state information indicates the states of the first and second storage regions after the determination, based on the error received by the managing device, of the states of the first and second storage regions.

4. A managing device comprising:
   a memory configured to store state information indicating a state of a first storage region and a state of a second storage region for storing data mirrored from the first storage region; and
   a processor coupled to the memory and configured to
   determine the states of the first and second storage regions based on the state information and an error received within a predetermined time period from a controlling device configured to execute an input and output process on the first storage region or the second storage region, and transmit, to the controlling device, the state information indicating the states after the determination of the states, when reading is enabled to be executed on the first storage region and writing is not enabled to be executed on the first storage region, the processor is configured to transmit the state information after the determination to the controlling device, and when the reading and the writing are enabled to be executed on the first storage region, the processor is configured not to transmit the state information after the determination to the controlling device.

5. The managing device according to claim 4,
wherein the processor is configured to extract an error of the input and output process executed on the first storage region and an error of the input and output process executed on the second storage region from errors received from the controlling device within the predetermined time period in response to the reception of a request to generate a virtual volume for the first and second storage regions, wherein the processor is configured to execute a second determination process that includes determining the states of the first and second storage regions based on the extracted errors and the state information, and wherein the processor is configured to transmit the state information after the second determination process to a source that transmitted the request.

6. The managing device according to claim 5, wherein if the error received from the controlling device is an error of the input and output process executed on the first storage region, and the state information received within the predetermined time period indicates that the first and second storage regions are in normal states, the processor is configured to determine that the first storage region is in an abnormal state.

7. A storage system comprising:
a managing device configured to store state information indicating a state of a first storage region and a state of a second storage region for storing data mirrored from the first storage region; and a controlling device configured to execute an input and output process on the first storage region or the second storage region based on the state information received from the managing device, the controlling device includes:

a memory, and
a processor coupled to the memory and configured to:
detect an error of an input and output process executed on the first storage region,
execute, in response to the detection of the error, a first process if an access mode for the first storage region is a mode in which reading and writing are enabled, the first process including: notifying the managing device of the error, determine the states of the first and second storage regions based on the error and the state information; and selecting, based on the determined states, either one of executing the input and output process on the second storage region or stopping the input and output process executed on the first and second storage regions, and
execute, in response to the detection of the error, a second process if the access mode for the first storage region is a mode in which the reading is enabled and the writing is disabled, the second process including executing the input and output process on the second storage region and notify the managing device of the error, and
the managing device includes
a memory configured to store the state information, and
a processor coupled to the memory and configured to
determine the states of the first and second storage regions based on an error received from the controlling device within a predetermined time period and the state information stored in the managing device, and
transmit, to the controlling device, the state information indicating the states after the determination of the states.

8. The storage system according to claim 7,
wherein the first process executed by the processor of the controlling device includes:
determining, if the state information indicates that the second storage region is in a normal state, that the first storage region is in an abnormal state; and
executing the input and output process on the second storage region.

9. A control method executed by a controlling device configured to receive state information indicating a state of a first storage region and a state of a second storage region from a managing device configured to manage the state of the first storage region and the state of the second storage region for storing data mirrored from the first storage region, the method comprising:
detecting an error of an input and output process executed on the first storage region;
executing, in response to the detection of the error, a first process if an access mode for the first storage region is a mode in which reading and writing are enabled, the first process including notifying the managing device of the error, determining the states of the first and second storage regions based on the error and the state information received by the controlling device, and selecting, based on the determined states, either one of executing the input and output process on the second storage region or stopping the input and output process executed on the first and second storage regions; and
executing, in response to the detection of the error, a second process if the access mode for the first storage region is a mode in which the reading is enabled and the writing is disabled, the second process including executing the input and output process on the second storage region and notifying the managing device of the error.

10. The control method according to claim 9,
wherein the first process includes:
determining, if the state information indicates that the second storage region is in a normal state, that the first storage region is in an abnormal state; and
executing the input and output process on the second storage region.

11. A management method for a managing device configured to store state information indicating a state of a first storage region and a state of a second storage region for storing data mirrored from the first storage region, the method comprising:
determining the states of the first and second storage regions based on the state information and an error received within a predetermined time period from a controlling device configured to execute an input and output process on the first storage region or the second storage region; and transmitting, to the controlling device, the state information indicating the states after the determination of the states, when reading is enabled to be executed on the first storage region and writing is not enabled to be executed on the first storage region, transmitting the state information after the determination to the controlling device, and when the reading and the writing are enabled to be executed on the first storage region, performing not to transmit the state information after the determination to the controlling device.

12. A non-transitory computer-readable storage medium storing a program that causes a controlling device to execute a process, the controlling device being configured to receive state information indicating the state of a first storage region and the state of a second storage region from a managing device configured to manage the state of the first storage region and the state of the second storage region for storing data mirrored from the first storage region, the process comprising:

detecting an error of an input and output process executed on the first storage region;

executing, in response to the detection of the error, a first process if an access mode for the first storage region is a mode in which reading and writing are enabled, the first process including notifying the managing device of the error, determining the states of the first and second storage regions based on the error and the state information received by the controlling device, and selecting, based on the determined states, either one of executing the input and output process on the second storage region or stopping the input and output process executed on the first and second storage regions; and executing, in response to the detection of the error, a second process if the access mode for the first storage region is a mode in which the reading is enabled and the writing is disabled, the second process including executing the input and output process on the second storage region and notifying the managing device of the error.

13. The storage medium according to claim 12, wherein the first process includes:

determining, if the state information indicates that the second storage region is in a normal state, that the first storage region is in an abnormal state; and executing the input and output process on the second storage region.

14. A non-transitory computer-readable storage medium storing a program that causes a managing device to execute a process, the managing device being configured to store state information indicating the state of a first storage region and the state of a second storage region for storing data mirrored from the first storage region, the process comprising:

determining the states of the first and second storage regions based on the state information and an error received within a predetermined time period from a controlling device configured to execute an input and output process on the first storage region or the second storage region; and transmitting, to the controlling device, the state information indicating the states after the determination of the states, when reading is enabled to be executed on the first storage region and writing is not enabled to be executed on the first storage region, transmitting the state information after the determination to the controlling device, and when the reading and the writing are enabled to be executed on the first storage region, performing not to transmit the state information after the determination to the controlling device.

* * * * *